(12) United States Patent
Nutaro et al.

(10) Patent No.: US 9,001,053 B2
(45) Date of Patent: Apr. 7, 2015

(54) DISPLAY SYSTEM FOR CONTROLLING A SELECTOR SYMBOL WITHIN AN IMAGE

(75) Inventors: Joseph Nutaro, Phoenix, AZ (US); Steven Grothe, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1007 days.

(21) Appl. No.: 12/914,785

(22) Filed: Oct. 28, 2010

(65) Prior Publication Data

US 2012/0105318 A1    May 3, 2012

(51) Int. Cl.
*G06F 3/041* (2006.01)
*G06F 3/0481* (2013.01)
*G06F 3/0488* (2013.01)
*G06F 3/0484* (2013.01)

(52) U.S. Cl.
CPC ........ *G06F 3/04815* (2013.01); *G06F 3/04883* (2013.01); *G06F 3/04847* (2013.01)

(58) Field of Classification Search
CPC ................... G06F 3/0481; G06F 2203/04801; G06F 3/041
USPC .................................................. 345/156–179
See application file for complete search history.

(56) References Cited

U.S. PATENT DOCUMENTS

| | | | |
|---|---|---|---|
| 4,521,870 A | 6/1985 | Babbel et al. | |
| 4,821,031 A | 4/1989 | Roberts | |
| 5,038,142 A | 8/1991 | Flower et al. | |
| 5,146,212 A * | 9/1992 | Venolia | 345/619 |
| 5,293,529 A * | 3/1994 | Yoshimura et al. | 345/158 |
| 5,956,021 A | 9/1999 | Kubota et al. | |
| 6,259,491 B1 | 7/2001 | Ekedahl et al. | |
| 6,297,811 B1 | 10/2001 | Kent et al. | |
| 6,492,979 B1 | 12/2002 | Kent et al. | |
| 6,567,070 B1 * | 5/2003 | Light et al. | 345/157 |
| 7,505,835 B2 | 3/2009 | Brust et al. | |
| 7,777,950 B2 | 8/2010 | Takagi et al. | |
| 7,786,953 B2 | 8/2010 | Saishu | |
| 7,796,134 B2 | 9/2010 | Vesely et al. | |
| 7,796,200 B2 | 9/2010 | Chen et al. | |
| 2004/0027394 A1 | 2/2004 | Schonberg | |
| 2004/0125909 A1 * | 7/2004 | Griffith | 378/4 |
| 2007/0273712 A1 | 11/2007 | O'Mullan et al. | |
| 2008/0062173 A1 | 3/2008 | Tashiro | |
| 2008/0104546 A1 | 5/2008 | Chiu et al. | |
| 2008/0204476 A1 | 8/2008 | Montague | |
| 2009/0144664 A1 | 6/2009 | Kramer et al. | |
| 2009/0282369 A1 | 11/2009 | Jones | |
| 2010/0053219 A1 * | 3/2010 | Kornmann | 345/653 |
| 2010/0115455 A1 * | 5/2010 | Kim | 345/173 |
| 2010/0188503 A1 | 7/2010 | Tsai et al. | |

FOREIGN PATENT DOCUMENTS

CN         101286111 A  * 10/2008

* cited by examiner

*Primary Examiner* — Waseem Moorad
(74) *Attorney, Agent, or Firm* — Ingrassia Fisher & Lorenz, P.C.

(57) ABSTRACT

A display system for controlling a selector symbol within an image includes, but is not limited to, a display screen that is configured to detect a touch of an operator on a surface of the display screen and that is further configured to display a three-dimensional image. The display system further includes a processor that is operatively coupled to the touch screen. The processor is configured to command the display screen to display a three-dimensional selector symbol within the three-dimensional image, and to command the display screen to move the selector symbol within the three-dimensional image in a manner that corresponds with the touch of the operator.

17 Claims, 22 Drawing Sheets

DISPLAY SYSTEM FOR CONTROLLING A SELECTOR SYMBOL WITHIN AN IMAGE

TECHNICAL FIELD

The technical field generally relates to a display system and more particularly relates to a display system for controlling a selector symbol within an image.

BACKGROUND

Display systems that are capable of displaying three-dimensional presentations in a realistic three-dimensional field without the need to wear specialized glasses or other eye coverings are beginning to enter the marketplace. Such display systems employ stereoscopic techniques that create a genuine impression of depth on the part of the viewer. It is anticipated that such display systems will significantly penetrate into the market space presently occupied by conventional two-dimensional display systems.

One anticipated application for such display systems is in the aviation industry. Display systems capable of displaying three-dimensional presentations in a realistic three-dimensional field will likely provide pilots with enhanced situational awareness and a greater ability to perceive the airborne and ground environments below. Such display systems may, for example, be used to display the topographical environment around and beneath an aircraft during flight, to display a depiction of other airborne objects, and/or to display a three-dimensional projection of the aircraft's flight path through the three-dimensional environment. Existing systems, such as a synthetic vision system, attempt to provide a pilot with this information using two-dimensional display screens to display two-dimensional images rendered using common graphic techniques that create the appearance of perspective, but it is anticipated that display systems which are capable of displaying true three-dimensional images would enhance a pilot's ability to assimilate information about the airborne environment.

While three-dimensional display systems are just beginning to enter the marketplace, touch screen display systems are well known and have been widely used for years to provide control inputs into commanded systems in a wide variety of industries. Despite this widespread proliferation, touch screen display systems have had only limited penetration into the aviation industry. Recently however, this has begun to change and touch screen display systems are now being utilized with greater frequency in various aviation-related applications, such as controlling various systems on board an aircraft.

Some display systems that are configured to present a three-dimensional image also incorporate touch sensitive technologies, thereby allowing an operator to interact directly with the three-dimensional image through touch. However, because such display systems present realistic three-dimensional images, it may be challenging to accurately select an icon or lock onto a piece of symbology that is displayed within the three-dimensional image by simply touching a portion of the surface of the display system's display screen. This is because the object that the operator is attempting to point at will appear to be at different locations depending upon the perspective from which the three-dimensional image is viewed. Because the operator cannot reach through the surface of the display screen and into the three-dimensional environment to touch an object, use of standard touch screen technologies in conjunction with display systems that are configured to display three-dimensional images may result in ambiguity when the operator attempts to interact with the three-dimensional image.

BRIEF SUMMARY

Various embodiments of a display system for controlling a selector symbol within an image are disclosed herein.

In one embodiment, the display system includes, but is not limited to, a display screen that is configured to detect a touch of an operator on a surface of the display screen and further configured to display a three-dimensional image. The system further includes a processor that is operatively coupled to the touch screen. The processor is configured to command the display screen to display a three-dimensional selector symbol within the three-dimensional image and to command the display screen to move the selector symbol within the three-dimensional image in a manner that corresponds with the touch of the operator.

In another embodiment, the display system includes, but is not limited to, a display screen that is configured to detect a touch of an operator on a surface of the display screen, and that is further configured to display a three-dimensional image. The display system further includes a processor that is operatively coupled to the touch screen. The processor is configured to command the display screen to display a three-dimensional selector symbol within the three-dimensional image. The three-dimensional selector symbol has a first end that is displayed on the display screen proximate a first location where the operator has initially touched the surface of the display screen and has a second end that is displayed on the display screen at a second location spaced apart from the first end. The processor is further configured to command the display screen to display the three-dimensional selector symbol such that an orientation of the second end with respect to the first end corresponds with the first location. The processor is still further configured to command the display screen to adjust an azimuth and an inclination of the selector symbol within the three-dimensional image in a manner that corresponds with the touch of the operator.

In another embodiment, the display system includes, but is not limited to, a display screen that is configured to detect a touch of an operator on a surface of the display screen and that is further configured to display a three-dimensional image. The system further includes an input unit configured to receive an input of the operator. The system still further includes a processor that is operatively coupled to the touch screen and to the input unit, the processor configured to command the display screen to display a three-dimensional selector symbol within the three-dimensional image, and to command the display screen to move the selector symbol within the three-dimensional image in a manner that corresponds with the touch of the operator and with the input of the operator.

BRIEF DESCRIPTION OF THE DRAWINGS

The present invention will hereinafter be described in conjunction with the following drawing figures, wherein like numerals denote like elements.

DETAILED DESCRIPTION

Figure 1:
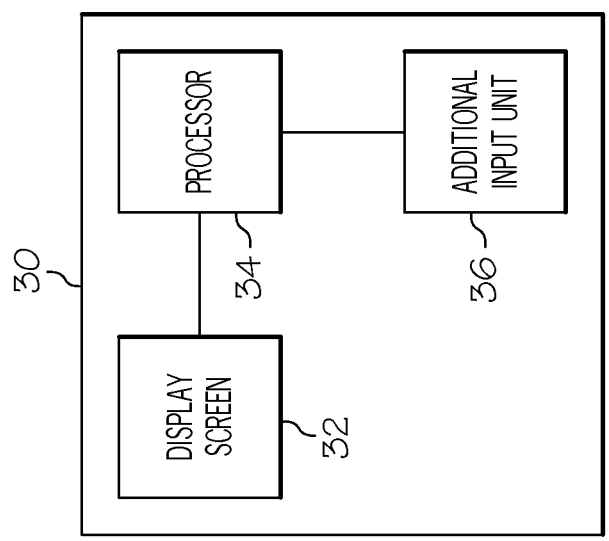
FIG. 1 is a schematic view illustrating an embodiment of a display system for controlling a selector symbol within an image made in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

An improved display system for controlling a selector symbol within an image is disclosed herein. The display system includes a display screen that is configured to render three-dimensional images, also known as stereoscopic images. As used herein, the term "three-dimensional" shall refer to a realistic appearing three-dimensional image rendered using stereoscopic techniques or other techniques that create an image and/or a field having a realistic portrayal of depth and a realistic appearance of spatial relationships between the various components within the image and/or field. Displays that are capable of displaying three-dimensional images are disclosed in U.S. Pat. Nos. 7,796,200; 7,796,134; 7,786,953; and 7,777,950, the disclosures of which are hereby incorporated herein in their entirety by reference. The display screen is further configured to detect touches on a surface of the display screen. Such touches may be used to provide input into a commanded system that is controlled by the display screen or by a processor that is communicatively or operatively coupled to the display screen. Touch screen displays are well known in the art. Multiple technologies exist that permit the detection of the touch on the surface of the display screen. Examples of touch screen displays are disclosed in U.S. Pat. Nos. 4,521,870; 4,821,031; 5,038,142; 5,956,021; 6,259,491; 6,297,811; and 6,492,979, the disclosures of which are hereby incorporated herein in their entirety by reference. As used herein, the term "touch" refers to any action taken by an operator that is detectable by a touch screen display and that is recognized by the touch screen display as being an interacting and/or actuating event. A touch may include, but is not limited to, actual physical contact with the touch screen display. An operator may touch the surface of the display screen using a finger, a stylus, a light stick, a laser light, or some other device. Such fingers or other devices will be collectively referred to herein as a "touching implement".

The display system further includes a processor that is communicatively and operatively coupled to the display screen and that is configured to command the display screen to display the three-dimensional images and to further display a three-dimensional selector symbol within the three-dimensional image. For example, if the three-dimensional image is of a landscape that an aircraft is flying above, and which includes various structures and navigation aids such as runways, and ground based navigation aids, etc., the three-dimensional selector symbol may be displayed as a spotlight that appears to extend from the surface of the display screen into the landscape or into the sky above the horizon. In one embodiment, the spotlight may include an illuminated region that is rendered on the ground of the landscape and a visible depiction of the spotlight's beam extending from the surface of the display screen to the illuminated region on the ground. In other embodiments, the three-dimensional selector symbol may simply be an illuminated region on the ground without an illuminated beam portion extending from the ground to the display screen. In still other embodiments, the three-dimensional selector symbol may take any suitable and/or desired form and is not limited by this discussion to any particular embodiment.

The processor is further configured to move the three-dimensional selector symbol through the three-dimensional image based on touches detected on the surface of the display screen. For example, an azimuth and an inclination of the three-dimensional selector symbol may be modified based on movement of the touching implement on or across the surface of the display screen. In some embodiments, an additional input device may be included in the display system. The additional input device is operatively connected to the processor and utilized by an operator in conjunction with the display screen to control movement of the three-dimensional selector symbol. By providing inputs into the display system via the touch screen and via any additional input devices, the operator can swivel, rotate, and translate the three-dimensional selector symbol around and throughout the three-dimensional image. In some embodiments, when the illuminated region is positioned over a selectable item (e.g., a runway or another aircraft), the illuminated region may change its configuration to indicate that the highlighted item can be selected. In this manner, an operator may manipulate the three-dimensional selector symbol to select one or more of the various items displayed in the three-dimensional image.

In some embodiments, the three-dimensional selector symbol may appear to extend out of the touching implement. For example, the three-dimensional selector symbol may appear to be a spotlight or laser that is aligned with, and that extends from the operator's finger. This enables an operator to effectively point to and touch an object with the three-dimensional selector symbol in the three-dimensional image that the operator wishes to select. The display system may be configured such that as the operator rolls his or her finger on the display screen, the three-dimensional selector symbol changes its azimuth and its inclination to remain in alignment with the operator's finger and thus acts as an extension of the operator's finger that reaches into the three-dimensional image. In some embodiments, the display system may enable the operator to move the entire three-dimensional selector symbol within the three-dimensional image by dragging his or her finger across the surface of the display screen or via the use of control panels.

Using the three-dimensional selector symbol, an operator may select an object displayed within the three-dimensional image in the same way that an operator may use a cursor to select an object or text in a two-dimensional display. The configuration of the illuminated region may change when it passes over a selectable object. For example, the illuminated region may change in color, size, shape, and/or any combination thereof to provide an indication to the operator that the object is selectable. In some embodiments, the object itself may change in size, shape, and/or color when the illuminated region passes over it. In some embodiments, the display system may be capable of rendering multiple three-dimensional selector symbols within the three-dimensional image for the pilot's manipulation to permit the pilot to have multiple selectable objects selected at the same time.

A greater understanding of the embodiments of the display system for controlling a selector symbol within an image may be obtained through a review of the illustrations accompanying this application together with a review of the detailed description that follows.

FIG. 1 is a schematic view illustrating a display system 30 for controlling a three dimensional selector symbol. Display system 30 includes a display screen 32, a processor 34 and, in some embodiments, an additional input unit 36. In other embodiments, additional input unit 36 is not needed because of the ability of display screen 32 to detect touches and hence to detect operator inputs. Display screen 32 may be any suitable display screen that is configured to display the three-dimensional images and that is further configured to detect touches on the surface of the display screen and to transmit a signal corresponding with the detected touch to processor 34. Additional input unit 36 may be any conventional input device commonly associated with computer systems that are used by an operator to provide input into the computer system. Such input devices include, but are not limited to, a keyboard, a touchpad, a trackball, a mouse, a joystick, a microphone, a camera, and a motion detector. Additional input unit 36 is configured to receive an input from an operator and to generate an electronic signal corresponding with the operator input and to transmit that signal to processor 34.

Processor 34 may be any type of computer, computer system, microprocessor, collection of logic devices, a state machine, or any other analog or digital circuitry that is configured to calculate, and/or to perform algorithms, and/or to execute software applications, and/or to execute sub-routines, and/or to be loaded with and to execute any type of computer program. Processor 34 may comprise a single processor or a plurality of processors acting in concert. In some embodiments, processor 34 may be dedicated for use exclusively with display system 30, while in other embodiments processor 34 may be shared with other systems. In still other embodiments, processor 34 may be integrated into any of the other components of display system 30. For example, in some embodiments, processor 34 may be a component of display screen 32 or additional input unit 36.

Processor 34 is operatively coupled to display screen 32 and additional input unit 36. Such operative couplings may be made through the use of any suitable means of transmission including both wired and wireless connections. For example, each component may be physically connected to processor 34 via a coaxial cable or via any other type of wire connection effective to convey electronic signals. In other embodiments, each component may be coupled to processor 34 across a bus or other similar communication corridor. Examples of suitable wireless connections include, but are not limited to, a wireless communication protocol identified by the Bluetooth trademark, a Wi-Fi connection, an infrared connection or the like.

The operative coupling between processor 34 on the one hand, and display screen 32 and additional input unit 36 on the other hand, provides processor 34 with a pathway for the receipt and transmission of signals, commands, instructions, and interrogations to and from each component. Display screen 32 and additional input unit 36 are both configured to transmit input signals to processor 34 that correspond with operator inputs detected by each respective component. For example, when a touch is detected on the surface of display screen 32 or when an operator clicks a mouse or pulls on a joystick, display screen 32 and additional input unit 36 are configured to generate electronic signals corresponding to the detected input and to transmit those electronic signals to processor 34. Processor 34 is configured (i.e., processor 34 is loaded with and capable of executing suitable computer code, software and/or applications) to receive electronic signals generated by display screen 32 and additional input unit 36 and to interact with and coordinate with display screen 32 and additional input unit 36 for the purpose of controlling a three-dimensional selector symbol within a three-dimensional image displayed on display screen 32. When processor 34 receives the input signals provided by display screen 32 and/or by additional input unit 36, processor 34 sends a command to display screen 32 instructing display screen 32 to initiate display of a three-dimensional selector symbol on display screen 32 and/or to move the three-dimensional selector symbol through the three-dimensional image in a manner that corresponds with the input signal. Initializing the display of the three-dimensional selector symbol, the movement of the three-dimensional selector symbol, and other features will be discussed in greater detail below.

Figure 2:
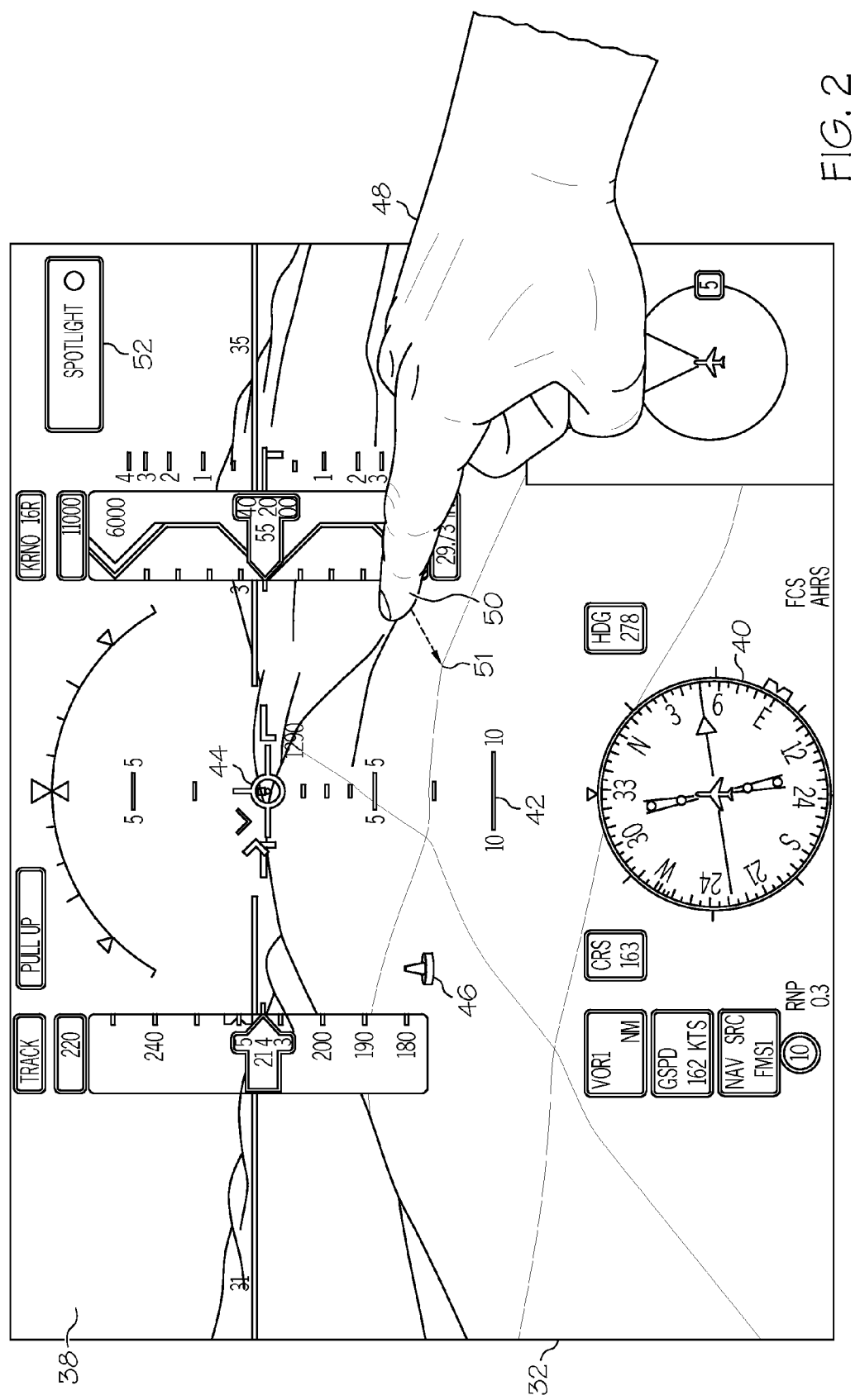
FIG. 2 illustrates a representation of a three-dimensional image rendered on the display system of FIG. 1 in accordance with an exemplary embodiment.

FIG. 2 illustrates a representation of a three-dimensional image 38 rendered by display screen 32 of display system 30 of FIG. 1. As illustrated, three-dimensional image 38 is a depiction of terrain and other features located beneath and/or around an aircraft (aircraft not shown). Overlaid on top of three-dimensional image 38 are conventional icons and symbology such as, but not limited to, a compass 40, a pitch ladder 42 and a flight path marker 44. These icons and symbology provide an operator with information pertaining to the location and orientation of the aircraft.

Also illustrated in three-dimensional image 38 is a selectable target 46. An operator wishing to select selectable target 46 will first take an initiating action that will initiate the display of a three-dimensional selector symbol. In the illustrated embodiment, the initiating action is a touch on the display screen. For ease of reference, this will be referred to herein as an "initiating touch". FIG. 2 illustrates an operator 48 just before making the initiating touch. Operator 48 will make the initiating touch on display screen 32 with finger 50 at location 51. In some embodiments, before making the initiating touch, an operator may first need to switch display system 30 to an appropriate mode for generating the three-dimensional selector symbol. For example, an operator may first need to touch a switch 52 to place display system 30 in a mode where it is enabled to generate a three-dimensional selector symbol. In the present embodiment, switch 52 is shown as an icon on the display screen. It should be understood that any other device may be used to actuate the three-dimensional selector symbol including a switch, button, lever, or any other type of actuator located in the flight deck to enable generating the three dimensional selector symbol. In other embodiments, the three-dimensional selector system could come on automatically based on any suitable condition or circumstance. In still other embodiments, the three-dimensional selector symbol could be constantly displayed.

Figure 3:
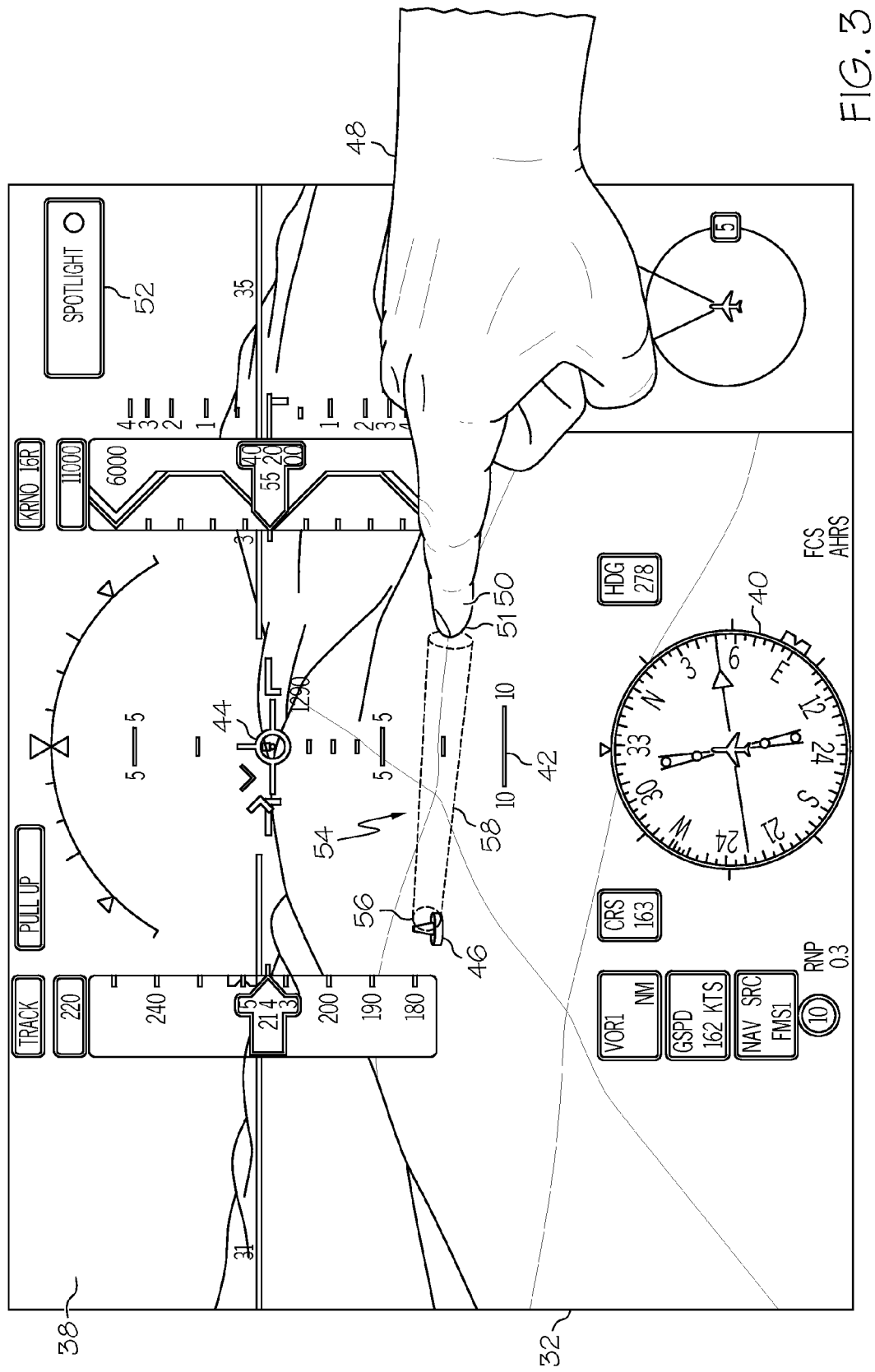
FIG. 3 illustrates the three-dimensional image of FIG. 2 as an operator engages a display screen to initiate display of the three-dimensional selector symbol in accordance with an exemplary embodiment.

FIG. 3 illustrates the three-dimensional image of FIG. 2 as operator 48 engages display screen 32 to initiate a display of a three-dimensional selector symbol 54. With continuing reference to FIGS. 1-3, when finger 50 makes contact with location 51, display screen 32 detects the contact between finger 50 and location 51 and transmits a signal to processor 34. Processor 34 receives the signal and, as a result of its programming, sends commands to display screen 32 to display three-dimensional selector symbol 54. As with three dimensional image 38, three-dimensional selector symbol 54 is also rendered in true three-dimensional fashion using stereoscopic rendering techniques to convey a realistic impression of depth. Three-dimensional selector symbol 54 includes an illuminated region 56 and a beam portion 58. In the illustrated embodiment, three-dimensional selector symbol 54 resembles a spotlight. In other embodiments, three-dimensional selector symbol 54 may take any other suitable shape and/or configuration. Illuminated region 56 is rendered such that it appears to touch the terrain depicted in three-dimensional image 38. Beam portion 58 extends backwards from illuminated region 56 towards display screen 32 and has a base portion that appears to contact display screen 32 just beneath finger 50. In other embodiments, three-dimensional selector symbol 54 will have a remote portion (such as illuminated region 56) that appears to rest on some object in three dimensional image 38 (e.g., the terrain, a selectable object on the terrain, an airborne object, etc.), a proximate portion that appears to rest on display screen 32, and a body that extends into the three-dimensional image from the proximate portion to the remote portion. Three-dimensional selector symbol 54 differs from conventional selector symbols in that three-dimensional selector symbol 54 is rendered stereoscopically to produce a realistic appearing Various strategies may be employed by processor 34 to govern the initial orientation of three-dimensional selector symbol 54 in response to the initiating touch on display screen 32. In the example illustrated in FIG. 3, processor 34 has been configured to orient three-dimensional selector symbol 54 such that three-dimensional selector symbol 54 extends from location 51 to the closest selectable target, in this case, selectable target 46. In this manner, three-dimensional selectable symbol 54 appears to extend from a tip of a finger 50 to selectable target 46. As discussed presently, other strategies for the initial rendering of three-dimensional selector symbol 54 may also be employed by processor 34.

Figure 4:
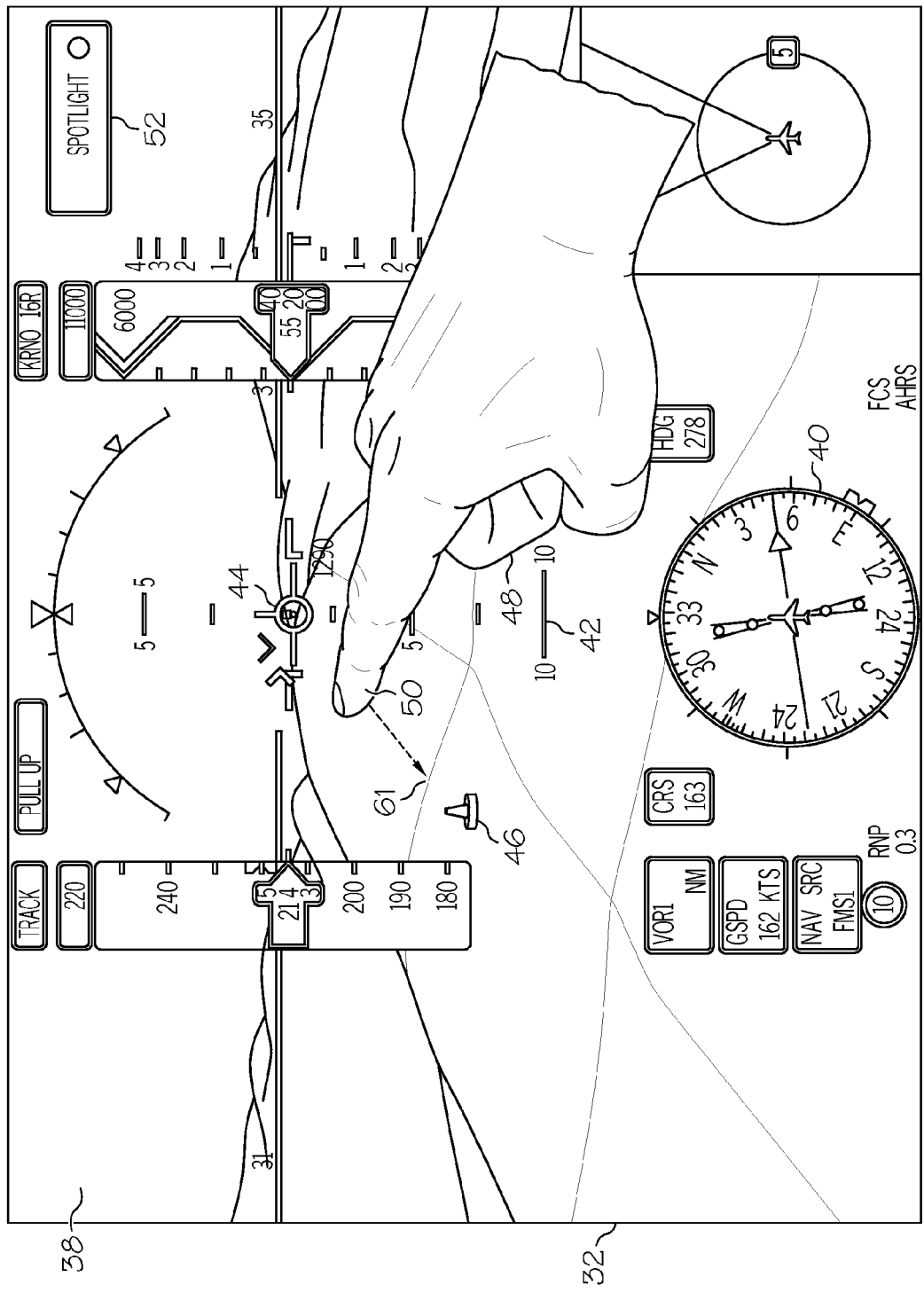
FIGS. 4-6 illustrate another strategy for initiating display of the three-dimensional selector symbol in accordance with an exemplary embodiment.
Figure 5:
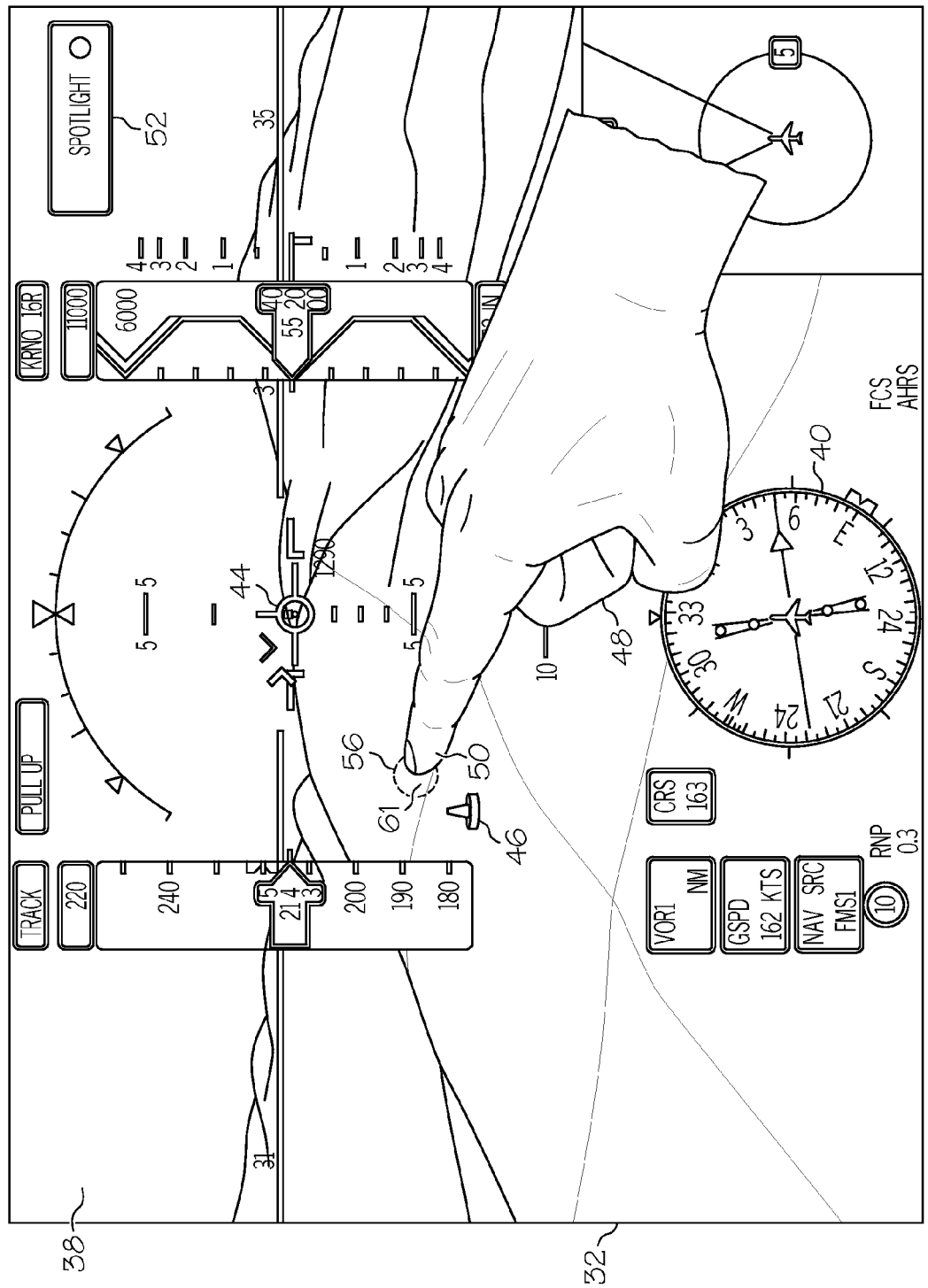
Figure 6:
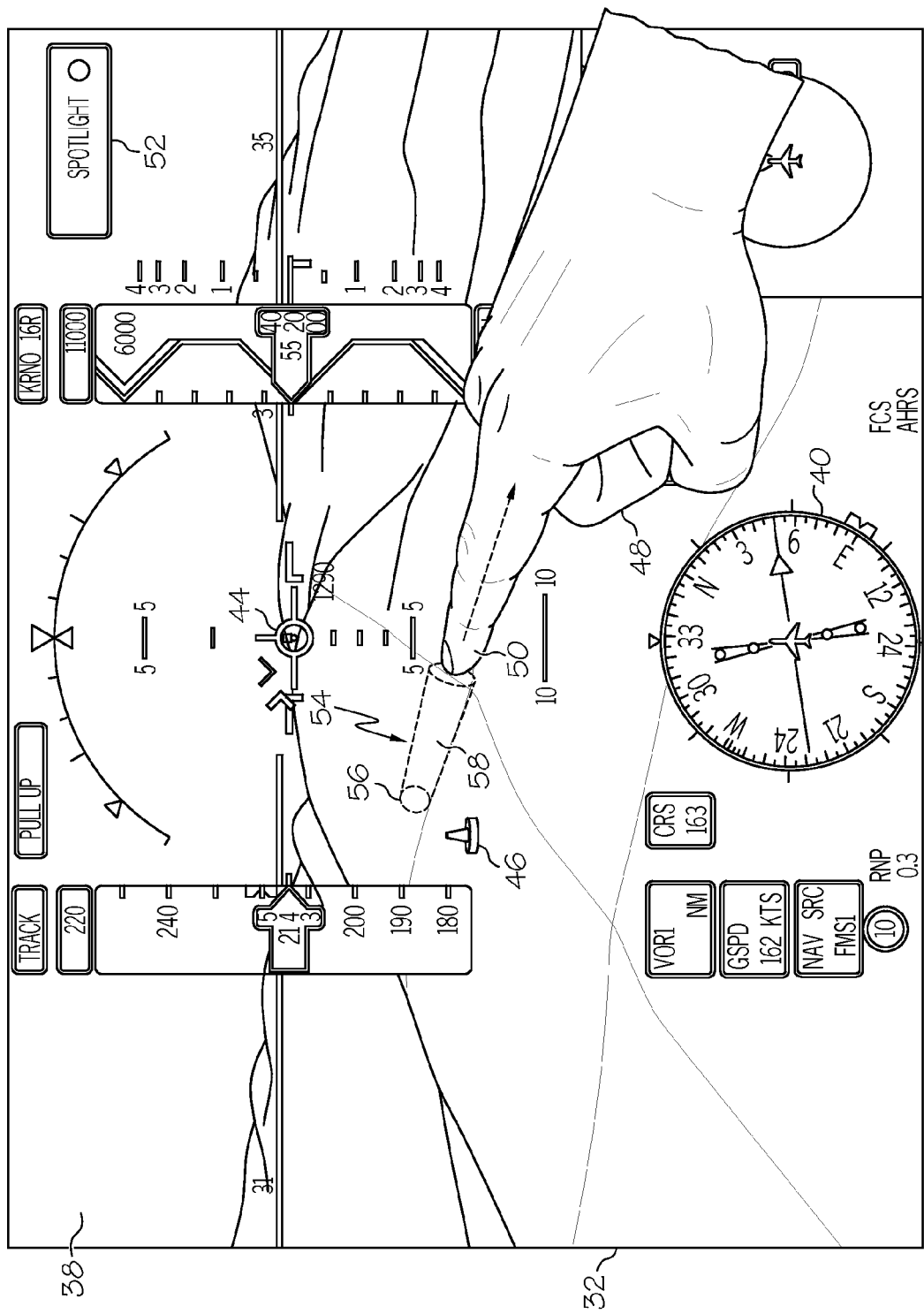

FIGS. 4-6 illustrate another strategy for initiating the display of a three-dimensional selector symbol. As shown in FIG. 4, operator 48 touches display screen 32 at a location 61. With continuing reference to FIGS. 1-6, the occurrence and the location of this touch is detected by display screen 32, which then transmits a signal to processor 34 conveying information about this touch, including its location on the surface of display screen 32. Processor 34 responds by sending a signal to display screen 32 commanding display screen 32 to display an illuminated region.

As shown in FIG. 5, after receiving commands from processor 34, display screen 32 displays illuminated region 56 within three-dimensional image 38 at a location corresponding with location 61 on the surface of display screen 32. At this point, display system 30 is waiting for further input from operator 48 before the remainder of the three-dimensional selector symbol can be rendered.

As shown in FIG. 6, operator 48 provides such additional input by dragging finger 50 to the right and in a slightly downward direction across display screen 32. This movement of finger 50 across the surface of display screen 32 is detected by display screen 32 and is transmitted to processor 34. In response, processor 34 provides display screen 32 with instructions to render beam portion 58 as extending from illuminated region 56 to the portion of display screen 32 immediately beneath the point on display screen 32 under the tip of finger 50. Using this technique, an operator may "draw" the three-dimensional selector symbol 54 as having any desirable length.

Figure 7:
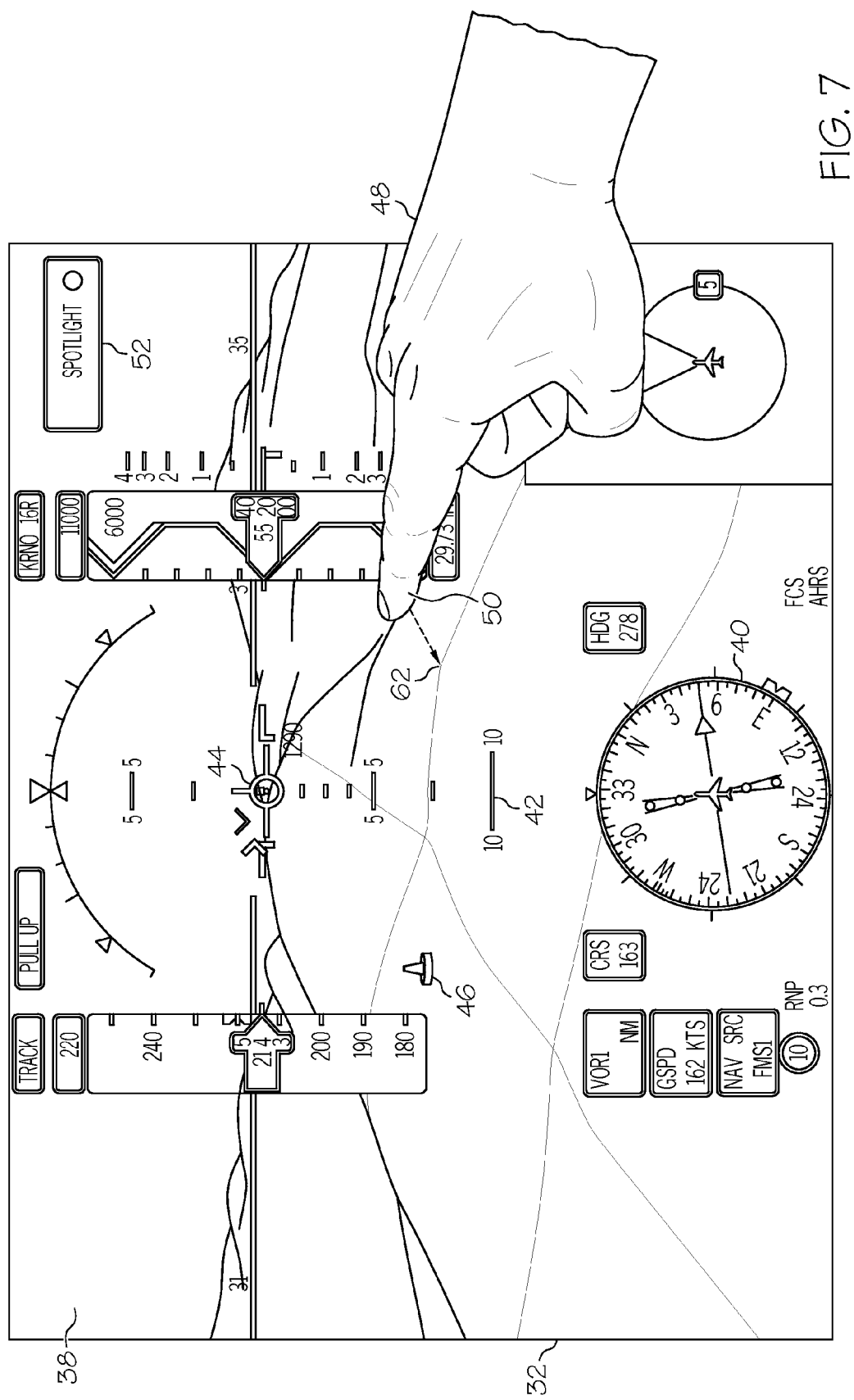
FIGS. 7-9 illustrate yet another strategy for initiating display of the three-dimensional selector symbol in accordance with an exemplary embodiment.
Figure 8:
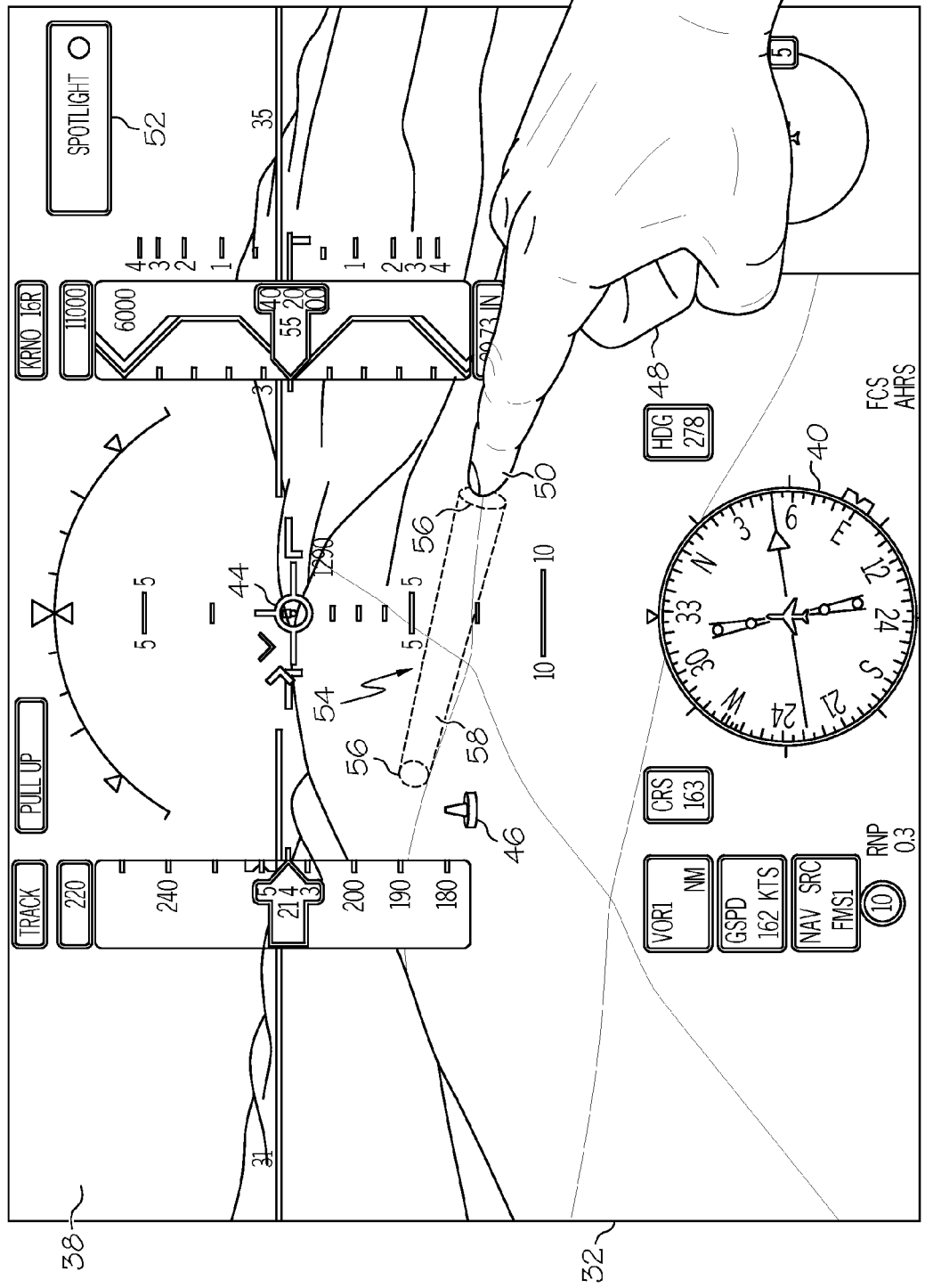
Figure 9:
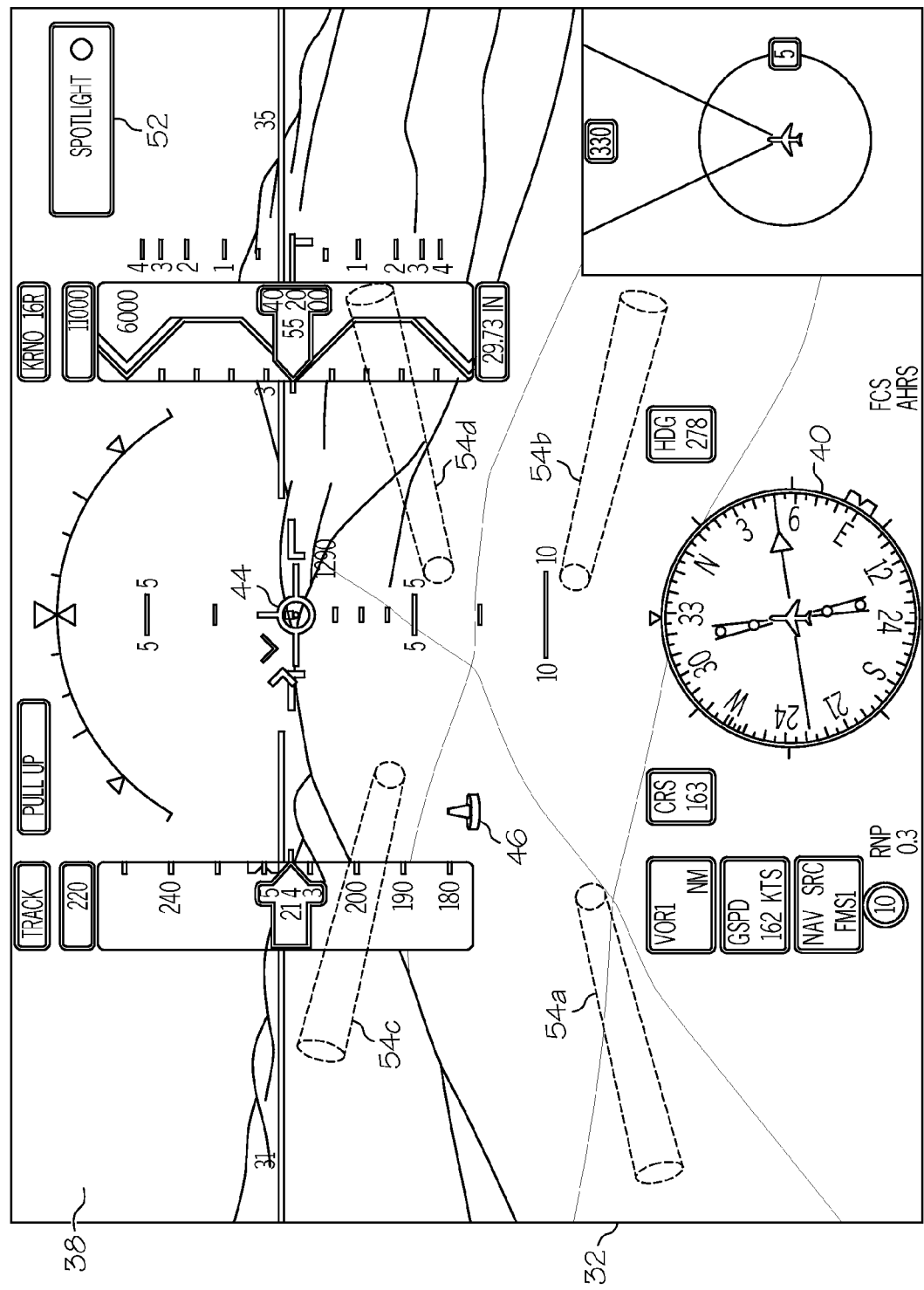

FIGS. 7-9 illustrate yet another strategy for initiating the display of a three-dimensional selector symbol. As illustrated in FIG. 7, operator 48 uses finger 50 to touch display screen 32 at a location 62. With continuing reference to FIGS. 1-9, display screen 32 will detect this touch and will transmit a signal corresponding to this touch, including its location on the surface of display screen 32, to processor 34. In response, processor 34 will transmit instructions to display screen 32 to project a three-dimensional selector symbol extending from location 62 or the tip of finger 50 into three-dimensional image 38 in a manner that corresponds with the position of location 62 on the surface of display screen 32. In the illustrated embodiment, if location 62 falls anywhere on the right half of display screen 32, then the three-dimensional selector symbol will extend from location 62 or a tip of finger 50 towards a left side of three-dimensional image 38. This is illustrated in FIG. 8 where three-dimensional selector symbol 54 extends upward and to the left from finger 50, with illuminated region 56 falling within the left side of three-dimensional image 38.

FIG. 9 provides a further illustration of this initiation strategy. If the initial touch is detected on the left side of display screen 32 and at a lower half of display screen 32, then three-dimensional selector symbol 54A will extend upwardly and towards the right side of three-dimensional image 38. If the initial touch is detected on the right side of display screen 32 and at a lower half of display screen 32, then three-dimensional selector symbol 54B will extend upwardly and towards the left side of three-dimensional image 38. If the initial touch is detected on the left side of display screen 32 and at an upper half of display screen 32, then three-dimensional selector symbol 54C will extend downwardly and towards the right side of three-dimensional image 38. If the initial touch is detected on the right side of display screen 32 and at an upper half of display screen 32, then three-dimensional selector symbol 54D will extend downwardly and towards the left side of three-dimensional image 38. It should be understood that the foregoing is not an exhaustive list of initiation strategies and that other initiation strategies are also possible. In some embodiments, in addition to controlling the orientation of the three-dimensional selector symbol when initiated, display system 30 may also be configured to allow operator 48 to specify and/or modify the length and/or other features of three-dimensional selector symbol 54.

Figure 10:
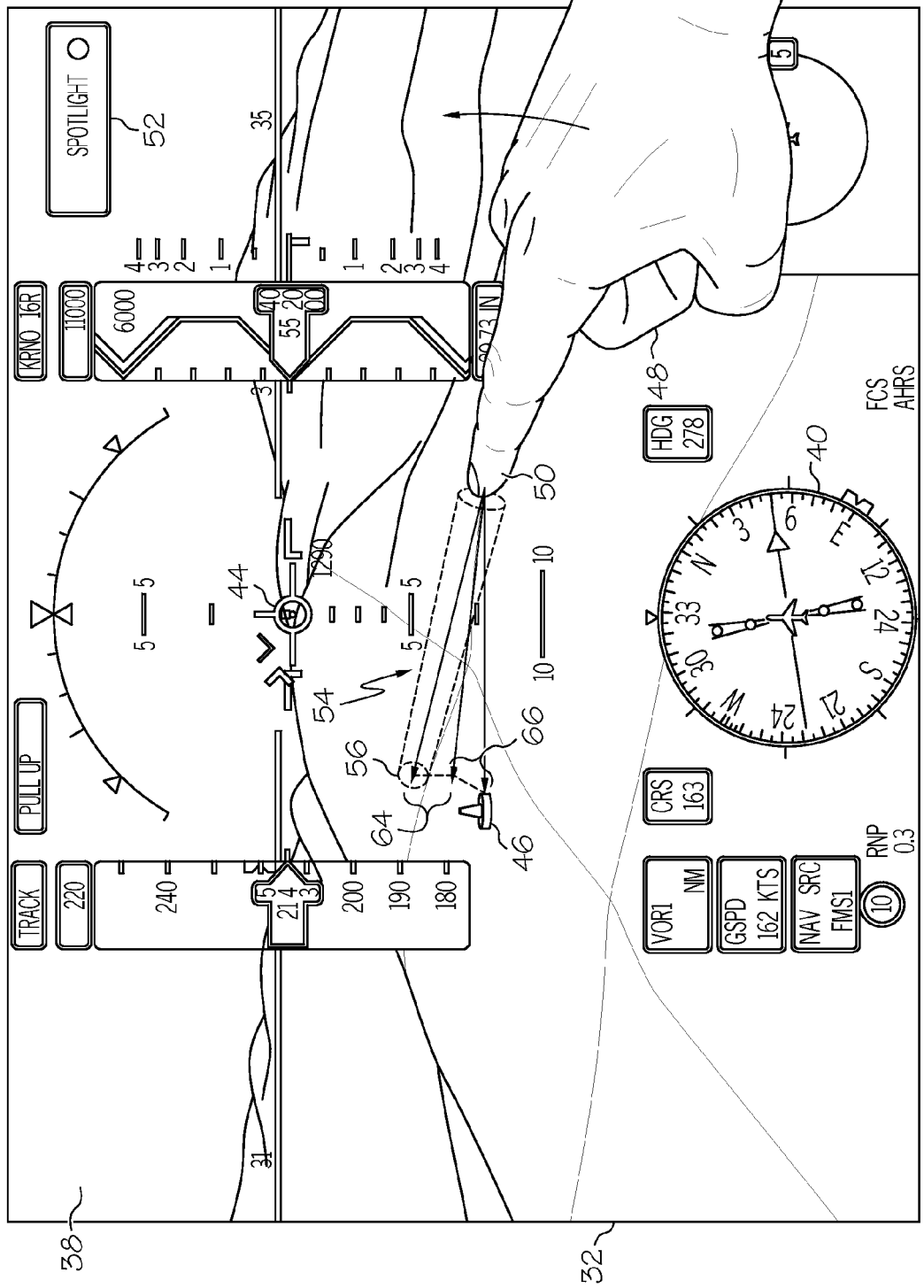
FIG. 10 illustrates the three-dimensional selector symbol's distance from a desired target in accordance with an exemplary embodiment.

FIG. 10 illustrates the distance between illuminated region 56 of three-dimensional selector symbol 54 and selectable target 46. Because three-dimensional image 38 is a stereoscopic three-dimensional representation of the terrain around the operator's aircraft, and because three-dimensional selector symbol 54 is a three-dimensional projection into three-dimensional image 38, the difference between illuminated region 56 and selectable target 46 can be broken down into components of azimuth and elevation or inclination. Inclination delta 64 represents the difference in elevation between illuminated region 56 and selectable target 46. Azimuthal delta 66 represents the difference in azimuth between illuminated region 56 and selectable target 46. Accordingly, in order to position the illuminated region 56 over selectable target 46, the elevation of three-dimensional selector symbol 54 is lowered by an amount equal to inclination delta 64 and the azimuth of three-dimensional selector symbol 54 is rotated in a counterclockwise direction (from the perspective of FIG. 10) by an amount equal to azimuthal delta 66. The inclination and the azimuth of three-dimensional selector symbol 54 can be controlled through the use of appropriate gestures input into display system 30 using display screen 32 and, in some embodiments, through the use of additional input unit 36.

Figure 11:
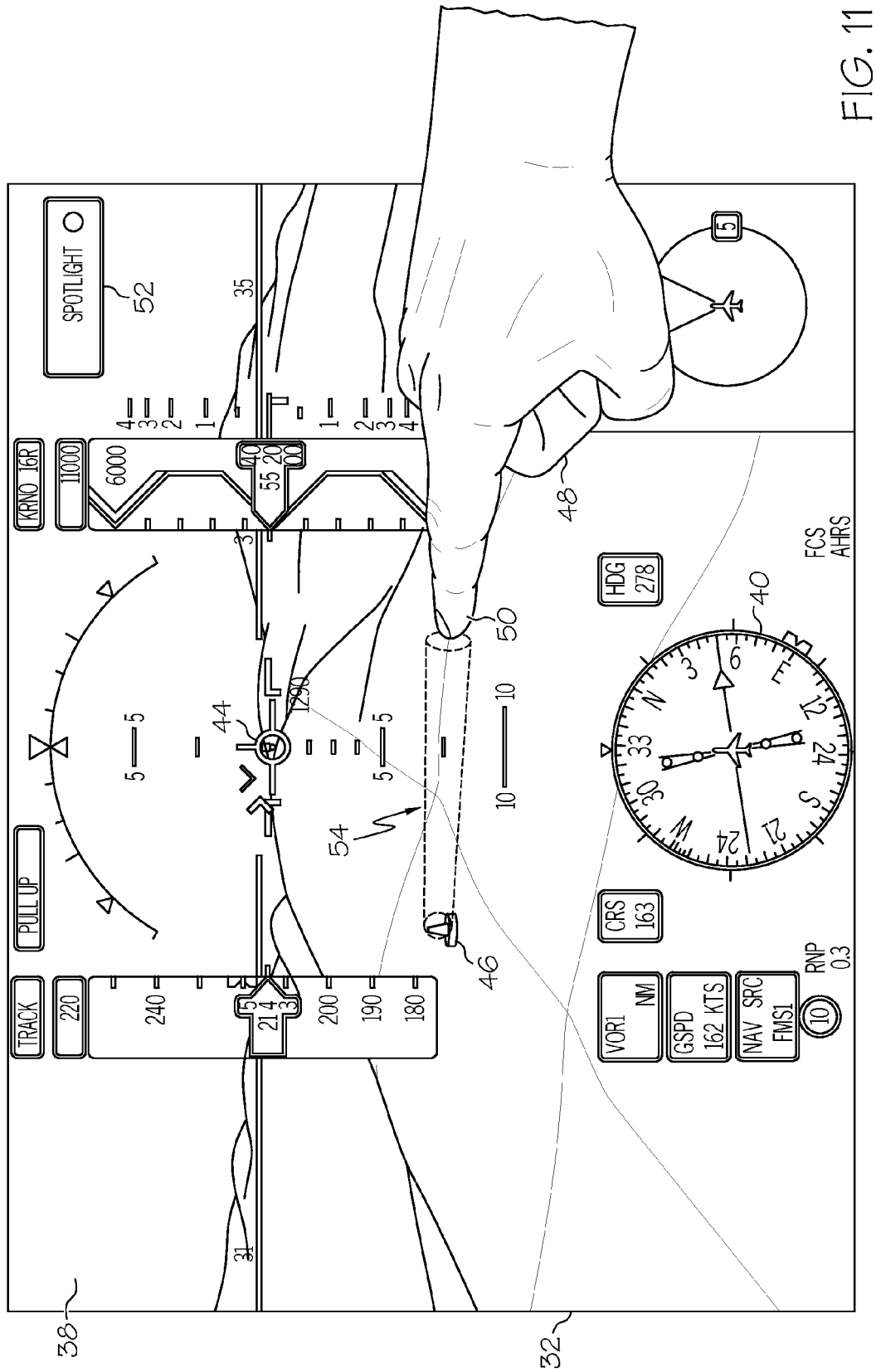
FIGS. 11-12 illustrate a technique for controlling an azimuth and an inclination of the three-dimensional selector symbol in accordance with an exemplary embodiment.
Figure 12:
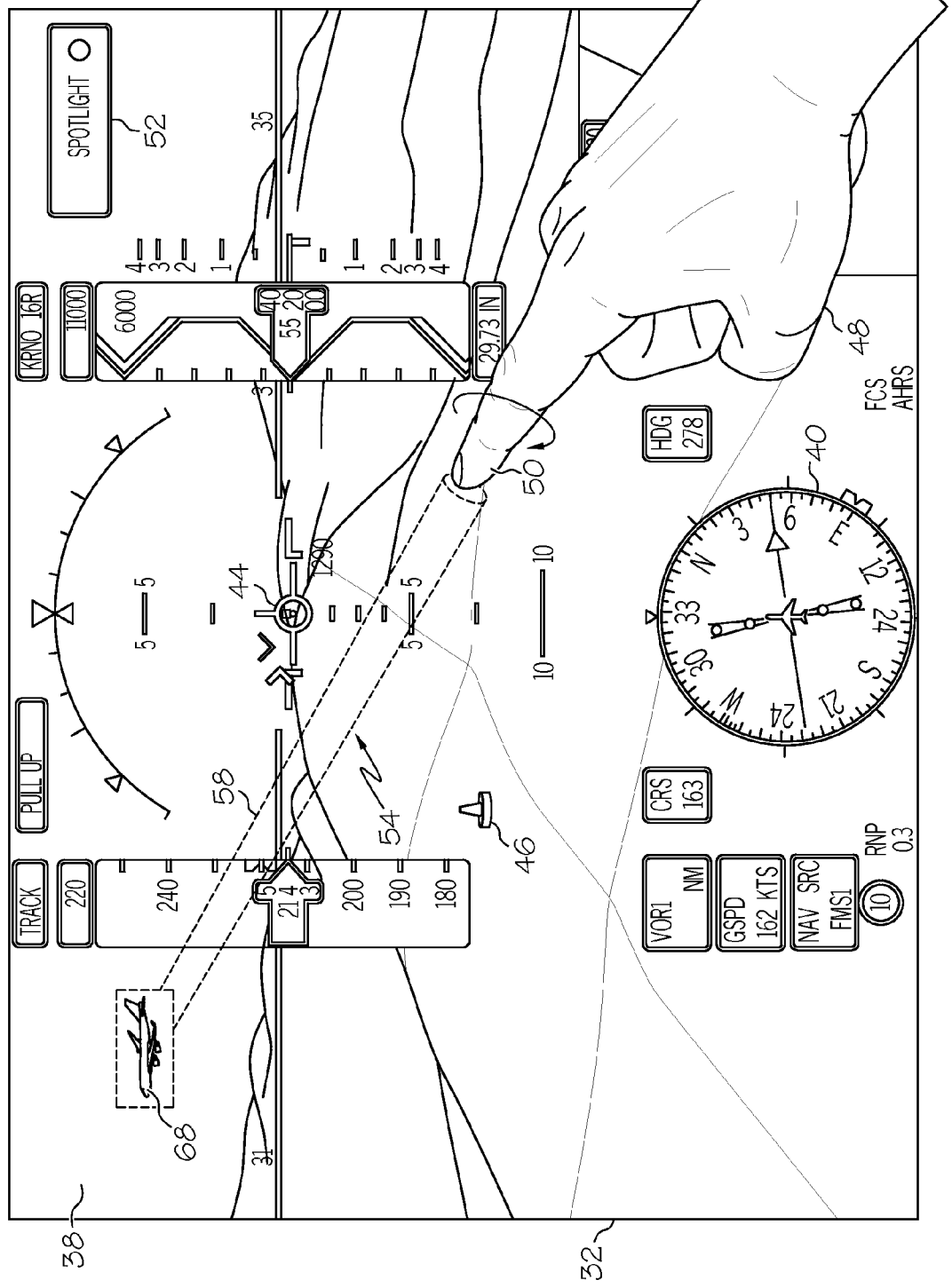

FIGS. 11-12 illustrate a technique for controlling an azimuth and an inclination of the three-dimensional selector symbol 54. Three-dimensional selector symbol 54 has been swiveled from the position illustrated in FIG. 10 to the position illustrated in FIG. 11 by the action of operator 48 in rolling the tip of finger 50 on the surface of display screen 32. As used with respect to a finger tip, the term "rolling" means that the finger tip does not slide across the surface of display screen 32, but rather remains in one location and pivots. Thus, as finger 50 rolls on the surface of display screen 32, a portion of finger 50 will peel up from the surface of display screen 32 as another portion of finger 50 makes contact with the surface of display screen 32. With continuing reference to FIGS. 1-11, the touch sensing abilities of touch screen 32 are such that the initiation of contact between portions of finger 50 and previously untouched portions of display screen 32 coupled with the cessation of contact between other portions of finger 50 and previously touched portions of display screen 32 will be detected by touch screen 32 and conveyed in a signal that will be interpreted by processor 34 is a rolling motion of finger 50. Changes in the azimuth and the inclination of three-dimensional selector symbol 54 will correspond with this rolling motion.

In one example, if operator 48 rolls the tip of finger 50 from one side to another in a generally horizontal direction without any significant up or down movement of the fingertip, then the azimuth of three-dimensional selector symbol 54 will change to correspond with the new position of finger 50 while the inclination of three-dimensional selector symbol 54 will remain the same. Conversely, if operator 48 rolls the tip of finger 50 in a vertically up or down direction without any significant side to side movement of the fingertip, then the azimuth of three-dimensional selector symbol 54 will remain substantially constant as the inclination of three-dimensional selector symbol 54 changes to correspond with the new position of finger 50. If finger 50 has rolled in a manner such that it has both a side to side component and an up-and-down component, then both the azimuth and the inclination of three-dimensional selector symbol 54 will change in a manner that corresponds with the new position of finger 50. In this manner, display system 30 can render three-dimensional selector symbol 54 in a manner such that it appears to be an extension of finger 50 that reaches into three-dimensional image 38. Other strategies of corresponding movement of three-dimensional selector symbol 54 with a detected movement of finger 50 on the surface of display screen 32 are also possible.

FIG. 12 illustrates the selection of a second selectable target 68. In this example, second selectable target 68 is not located on the terrain of three-dimensional image 38, but rather is an airborne target. As illustrated, operator 48 has rolled finger 50 in a downward direction resulting in a change in the inclination of three-dimensional selector symbol 54. In some embodiments, such as the embodiment illustrated in FIG. 12, display system 30 may be configured such that the length of beam portion 58 will vary depending upon the distance between the surface of display screen 32 and the terrain depicted in three-dimensional image 38. In such embodiments, the length of beam portion 58 will shorten and extend depending upon which portion of the depicted terrain illuminated region 56 is positioned over in the same way that the beam of a flashlight may appear to lengthen and shorten as it is directed towards different objects having different proximities to the flashlight in a darkened room. In other embodiments, beam portion 58 may have a length that remains constant as three-dimensional selector symbol swivels through three-dimensional image 38.

Figure 13:
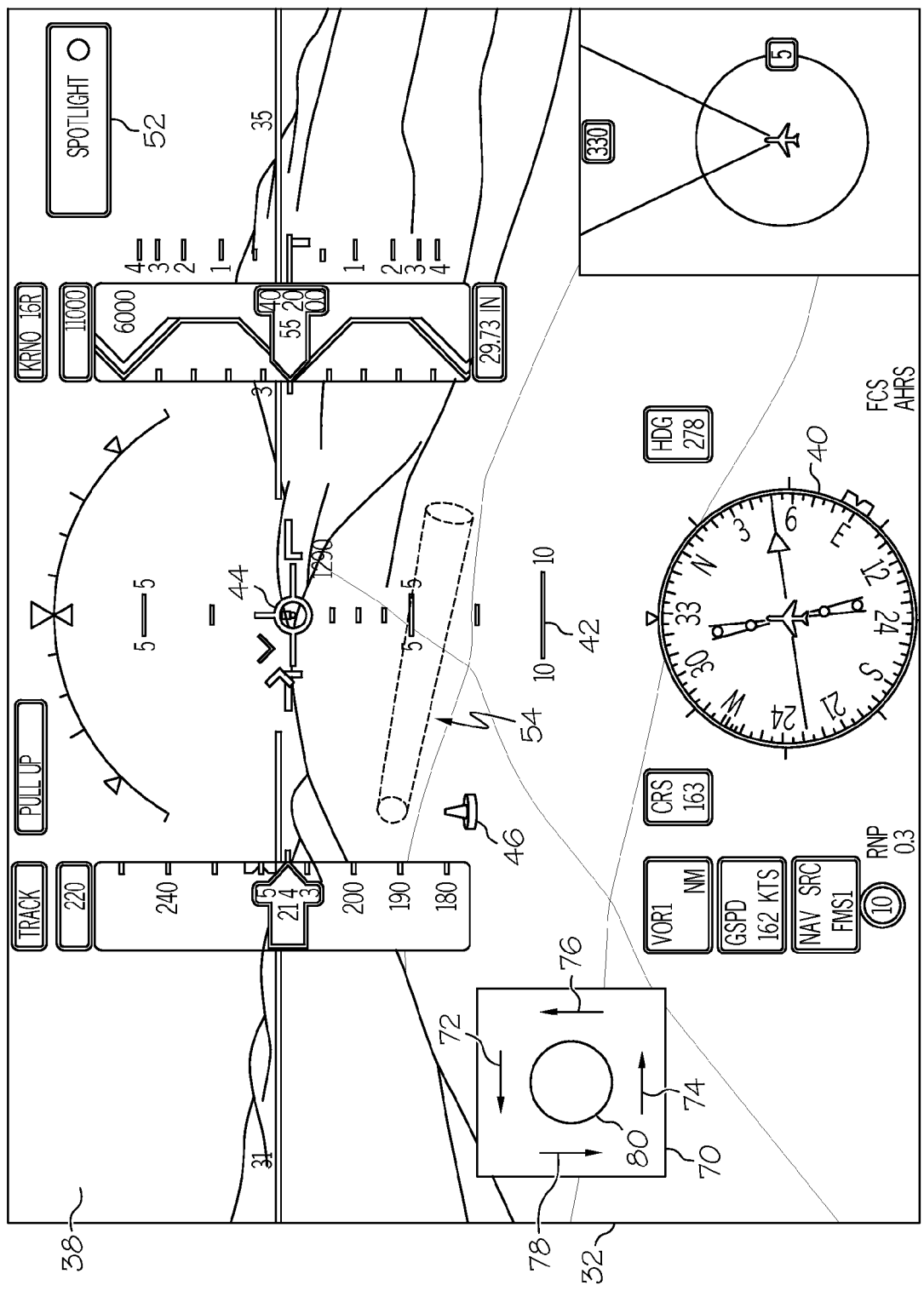
FIGS. 13-14 illustrate another technique for controlling the azimuth and the inclination of the three-dimensional selector symbol in accordance with an exemplary embodiment.
Figure 14:
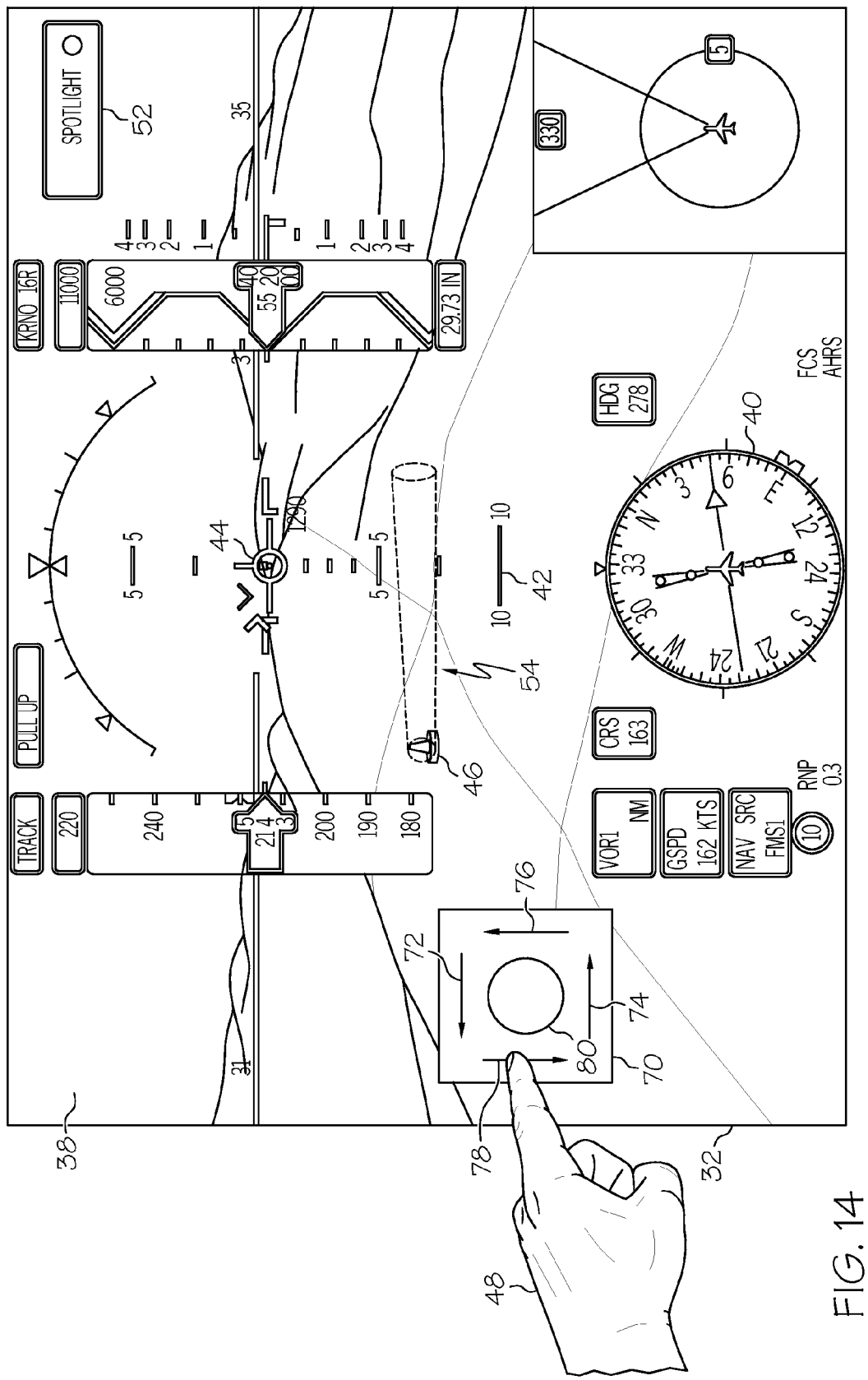

FIGS. 13-14 illustrate another technique for controlling the azimuth and the inclination of the three-dimensional selector symbol. With continuing reference to FIGS. 1-14, processor 34 may be configured to instruct display screen 32 to display a control panel 70 whenever three-dimensional selector symbol 54 is displayed. Control panel 70 may include control icons that can be used to control the swiveling of three-dimensional selector symbol 54 through three-dimensional image 38. For example, control panel 70 may include a first azimuth adjustment icon 72 and a second azimuth adjustment icon 74 to adjust the azimuth of three-dimensional selector symbol 54 and may include a first inclination adjustment icon 76 and a second inclination adjustment icon 78 to control the inclination of three-dimensional selector symbol 54. To change either the azimuth or the inclination of three-dimensional selector symbol 54, and operator need only touch one of these adjustment icons. Display screen 32 will detect the touch and transmit a signal indicative of the touch to processor 34. Processor 34 will then command display screen 32 to alter the azimuth and/or the inclination of three-dimensional selector symbol 54 in a manner that corresponds with the adjustment icon touched by operator 48.

Control panel 70 may further include position adjustment icon 80. In the illustrated embodiment, position adjustment icon 80 is a generally circular icon. In some embodiments, operator 48 may move three-dimensional selector symbol 54 from place to place around three-dimensional image 38 without altering its azimuth or its inclination by touching a point on the perimeter of position adjustment icon 80 that corresponds with the direction in three-dimensional image 38 at the operator wishes to move three-dimensional selector symbol 54.

Figure 15:
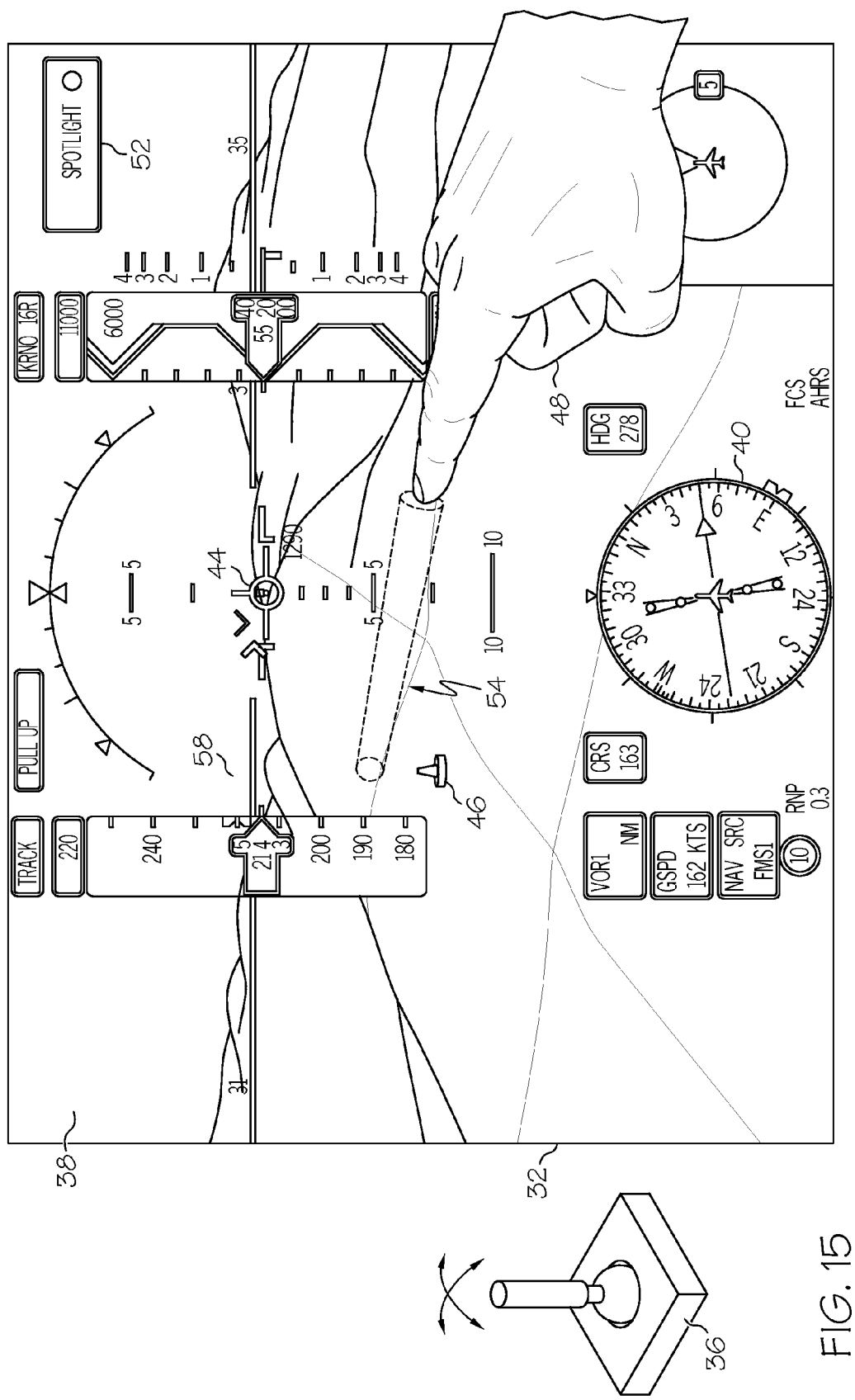
FIGS. 15-16 illustrate another technique for controlling the azimuth and the inclination of the three-dimensional selector symbol in accordance with an exemplary embodiment.
Figure 16:
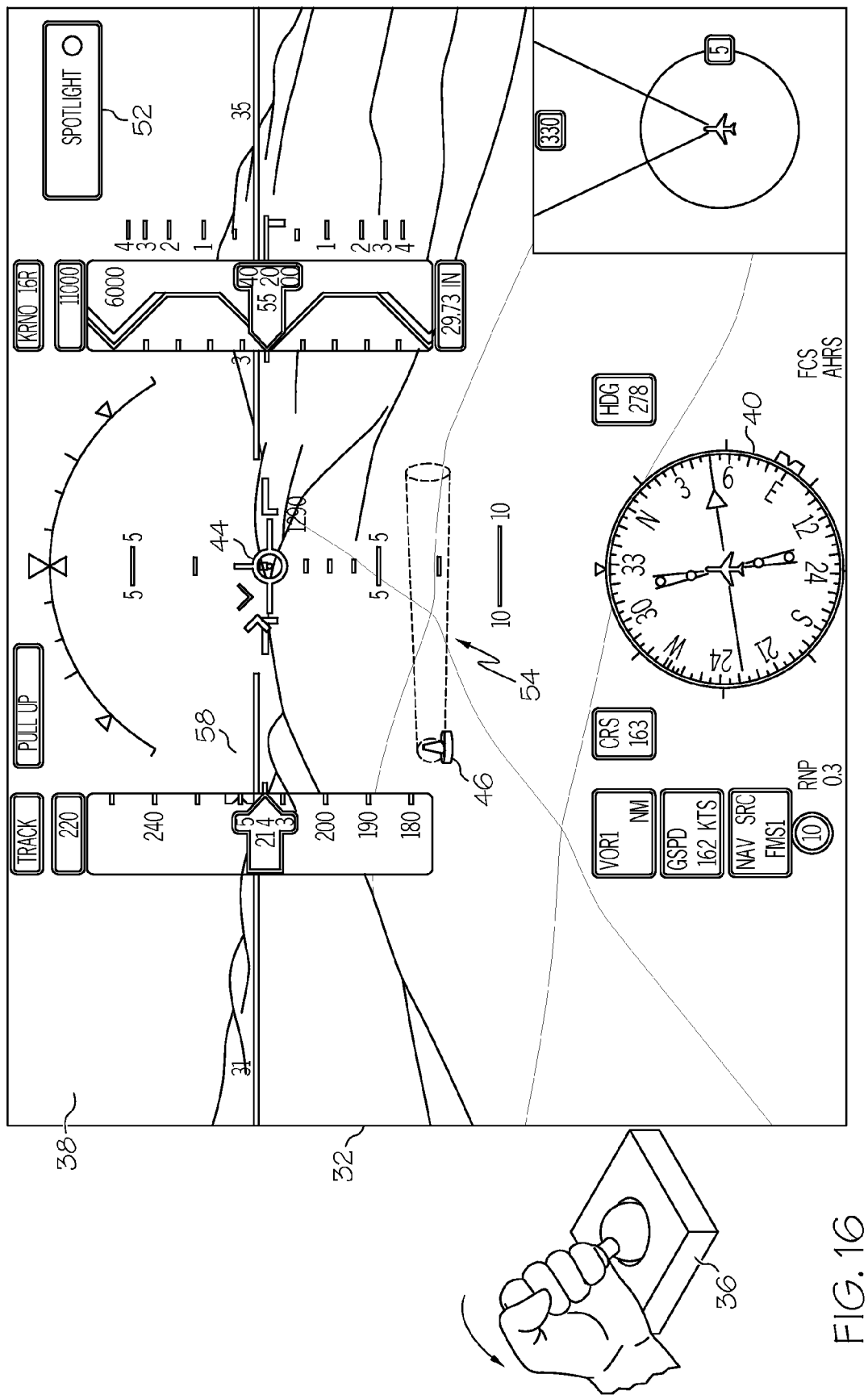

FIGS. 15-16 illustrate another technique for controlling the azimuth and the inclination of three-dimensional selector symbol 54. As illustrated, FIGS. 15 and 16 include additional input unit 36. In the illustrated embodiment, additional input unit 36 is a joystick that is configured to detect up and down movement, side to side movement and combinations thereof. With continuing reference to FIGS. 1-16, it should be understood that, in other embodiments, additional input unit 36 may comprise any suitable input unit configured to receive inputs from an operator and to convert those inputs into electronic signals for transmission to processor 34 (e.g., a mouse, a touchpad, etc.).

Operator 48 may initiate the display of three-dimensional selector symbol 54 using any suitable strategy, including any of the strategies described above. Once three-dimensional selector symbol 54 is displayed within three-dimensional image 38, then as illustrated in FIG. 16, operator 48 may alter the azimuth and the inclination of three-dimensional selector symbol 54 using additional input unit 36.

Figure 17:
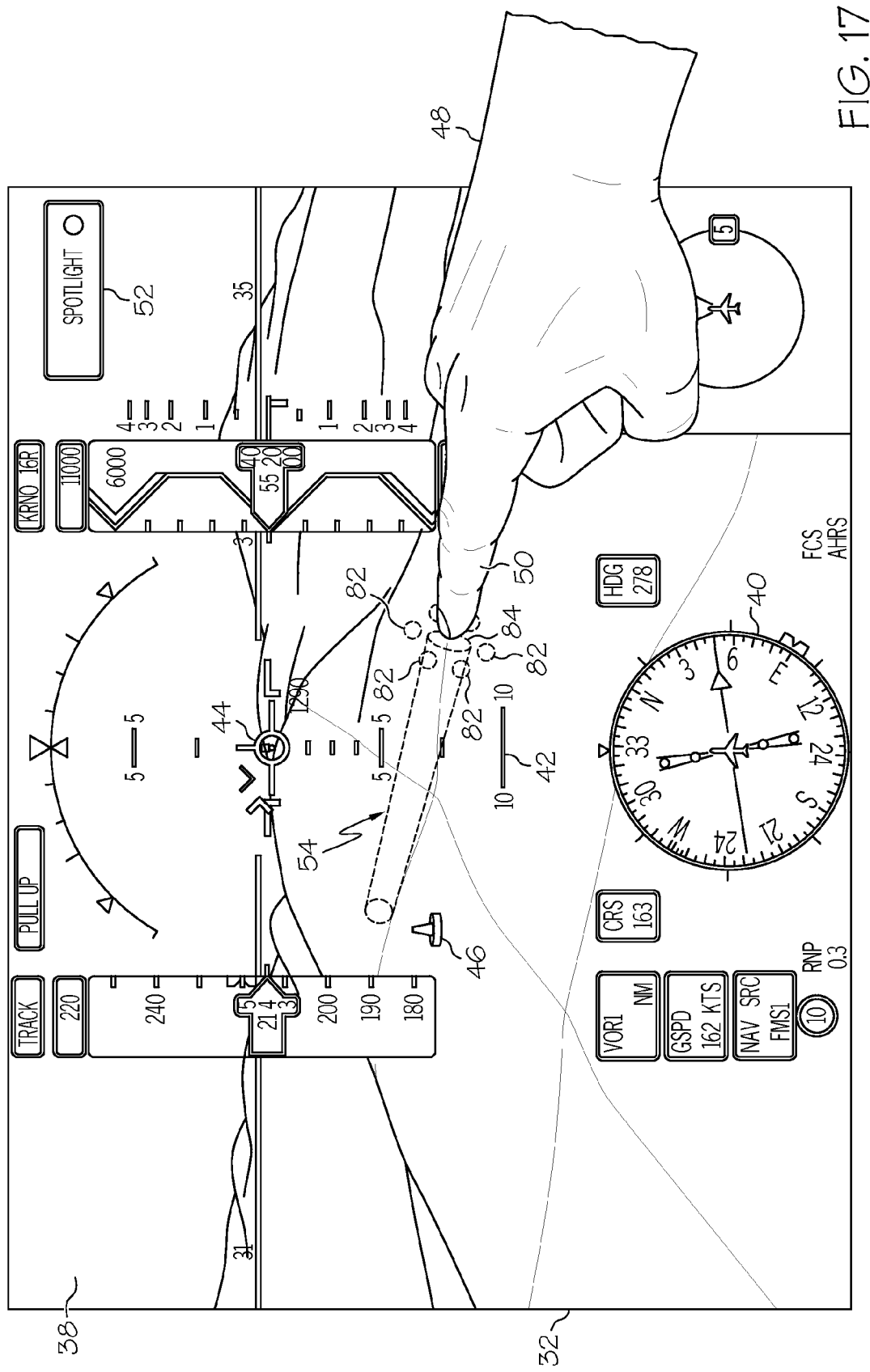
FIGS. 17-19 illustrate yet another technique for controlling the azimuth and the inclination of the three-dimensional selector symbol in accordance with an exemplary embodiment.
Figure 18:
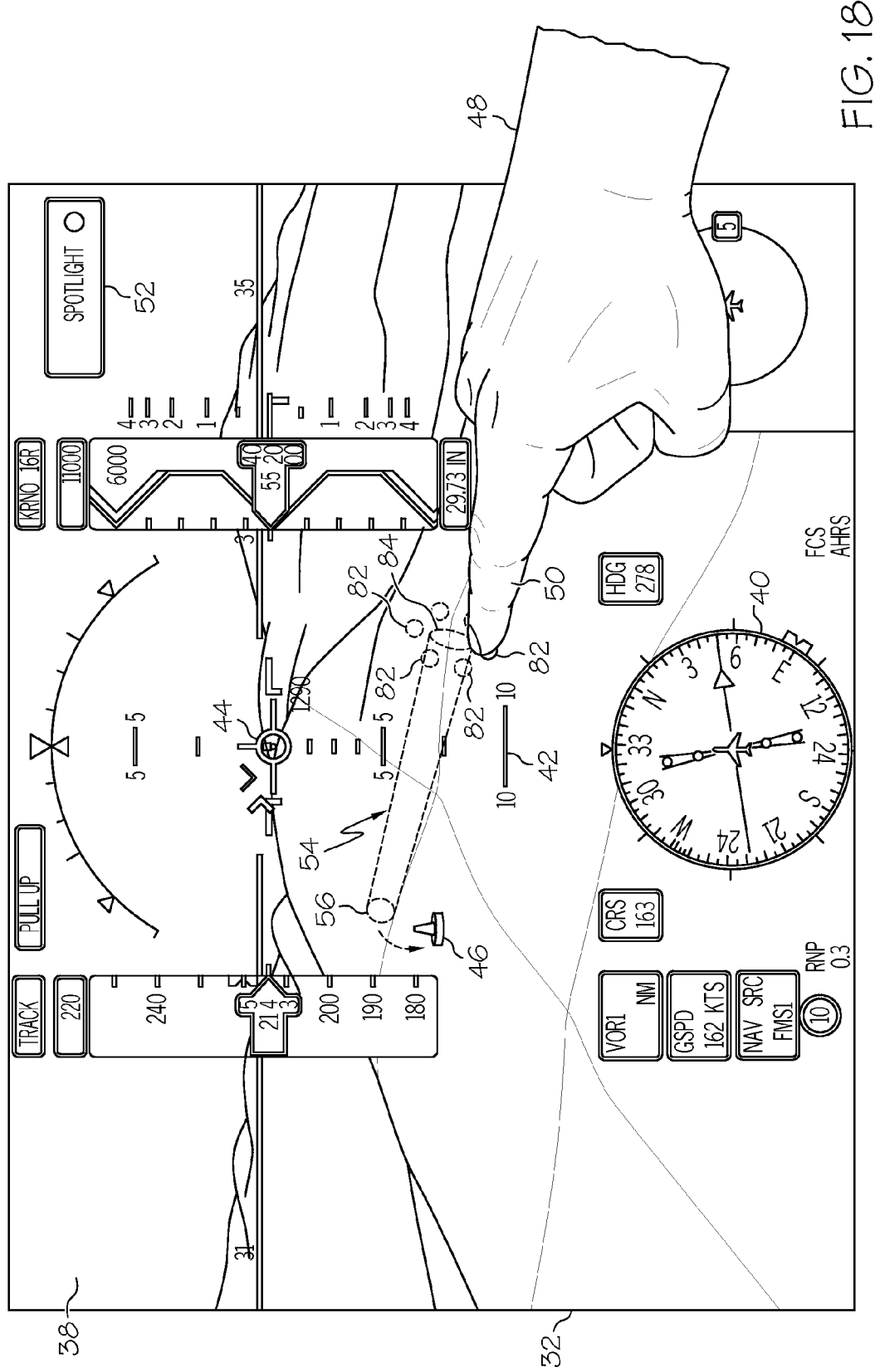
Figure 19:
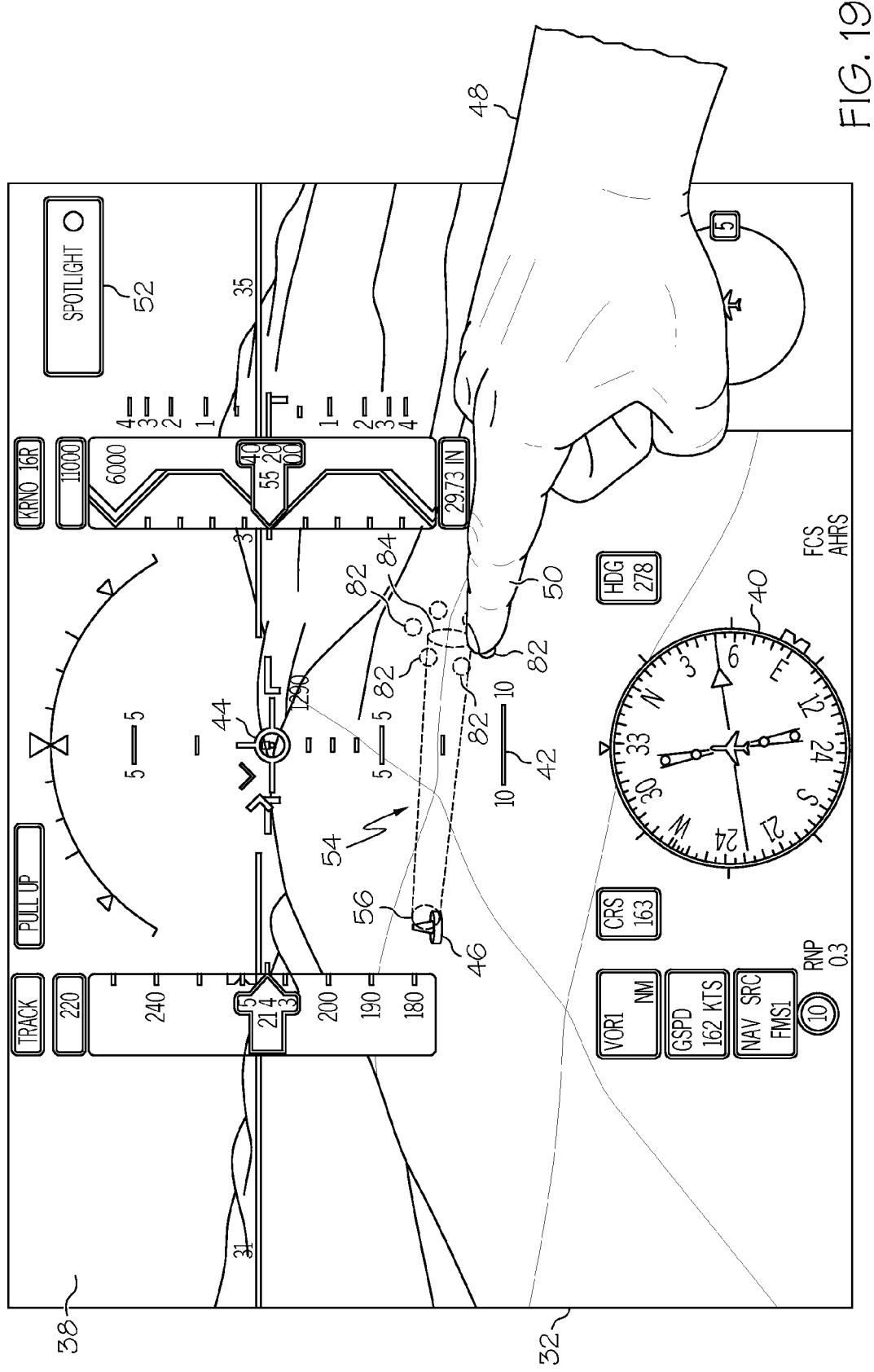

FIGS. 17-19 illustrate yet another technique for controlling the azimuth and the inclination of three-dimensional selector symbol 54. With continuing reference to FIGS. 1-19, when processor 34 sends instruction to display screen 32 to display three-dimensional selector symbol 54, processor 34 further instructs display screen 32 to also display a plurality of touch points 82. In some embodiments, such as the embodiment illustrated in FIG. 17, touch points 82 may be arranged around a periphery of a base 84 of three-dimensional selector symbol 54. Base 84 is the portion of three-dimensional selector symbol 54 that appears to contact touch screen 32. To alter the azimuth and/or the inclination of three-dimensional selector symbol 54, operator 48 need only touch one or more touch points 82. This is illustrated in FIGS. 18 and 19. In FIG. 18, operator 48 has moved finger 50 to touch one touch point 82, and in FIG. 19, three-dimensional selector symbol 54 has swiveled in a manner that positions illuminated region 56 directly over selectable target 46. In some embodiments, the position of each touch point 82 with respect to base 84 will determine whether the azimuth or the inclination (or both) of three-dimensional selector symbol 54 is adjusted. For example, if operator 48 were to touch the touch point that is located directly above base 84, the inclination of three-dimensional selector symbol 54 would be raised. If operator 48 were to touch the touch point located directly to the right of base 84, then the azimuth of three-dimensional selector symbol 54 would be adjusted in a clockwise direction (from the perspective of FIGS. 18 and 19).

Figure 20:
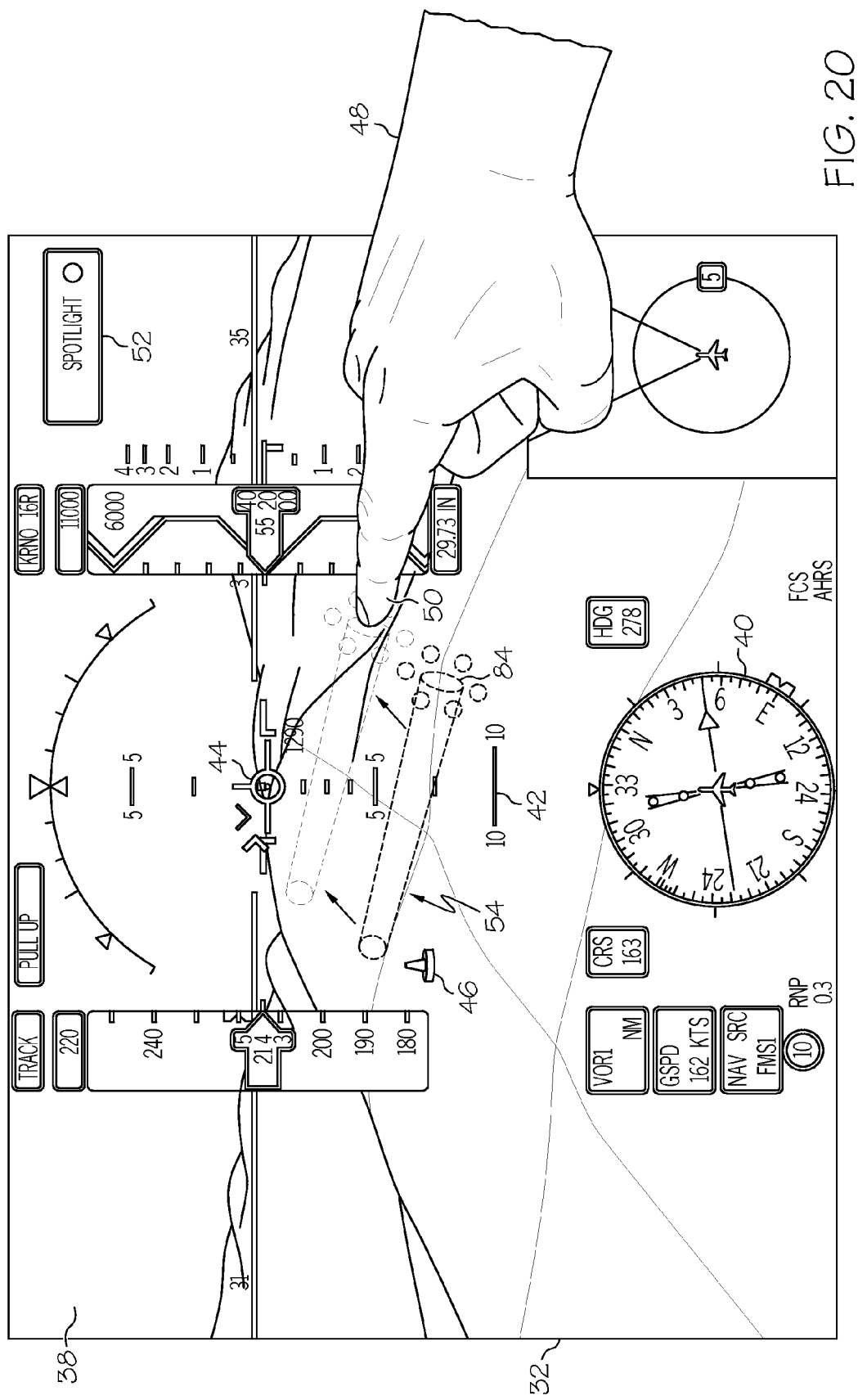
FIG. 20 illustrates a technique for moving the three-dimensional selector symbol without altering either its azimuth or its inclination in accordance with an exemplary embodiment.

FIG. 20 illustrates a technique for moving three-dimensional selector symbol 54 without altering either its azimuth or its inclination. Operator 48 may place a finger 50 on base 84 and then drag finger 50 across the surface of display screen 32 to any desired location. This action will cause the three-dimensional selector symbol 54 to move to the location indicated by operator 48 without causing any change in the inclination or the azimuth of three-dimensional selector symbol 54.

Figure 21:
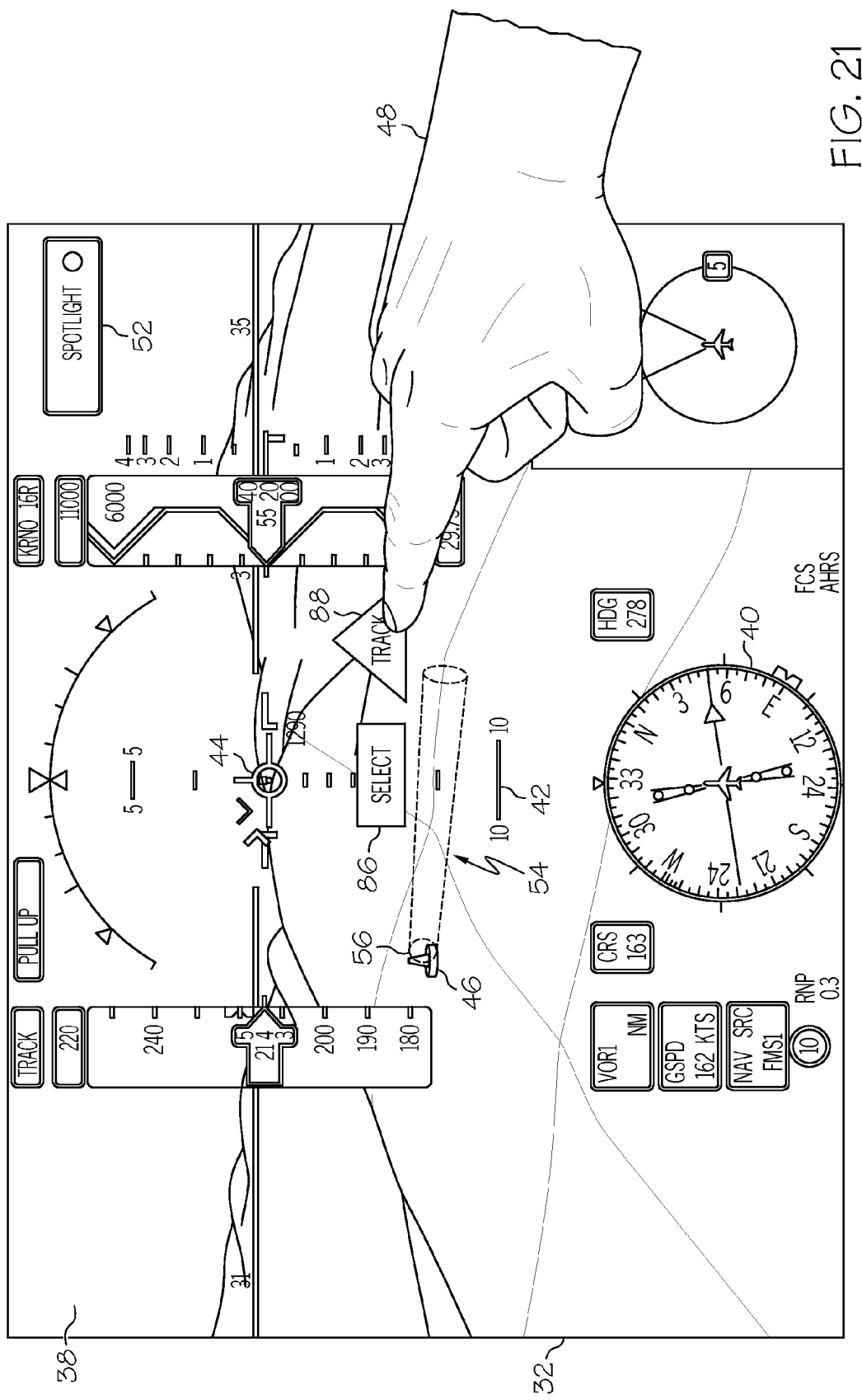
FIG. 21 illustrates a technique for selecting and tracking a target using the three-dimensional selector symbol in accordance with an exemplary embodiment.

FIG. 21 illustrates a technique for selecting and tracking selectable target 46 using three-dimensional selector symbol 54. With continuing reference to FIGS. 1-21, by using any of the methods described above, operator 48 may initiate the display of three-dimensional selector symbol 54 and may swivel three-dimensional selector symbol 54 so as to position the illuminated region 56 over selectable target 46. In some embodiments, when illuminated region 56 passes over a selectable target, processor 34 may be configured to command display screen 32 to display symbols, icons, text, and/or other suitable graphics which enable operator 48 to initiate various actions with respect to selectable target 46. For example, processor 34 may cause display screen 32 to display a selection icon 86 and a tracking icon 88. To select selectable target 46, operator 48 may touch selection icon 86. To select tracking icon 88, operator 48 may touch tracking icon 88. In either event, the touch would be detected by display screen 32, which would, in turn, send a signal indicative of the touch to processor 34. Processor 34 would then send commands to display screen 32 to display additional text, graphics, or any combination thereof corresponding with the selection made by operator 48.

In the example illustrated in FIG. 21, operator 48 has selected tracking icon 88. In some embodiments, selection of tracking icon 88 may cause three-dimensional selector symbol 54 to remain locked onto selectable target 46. Thus, as the aircraft continues to fly and three-dimensional image 38 continues to change, thus indicating relative movement between the terrain and the aircraft, three-dimensional selector symbol 54 will maintain the position of illuminated region 56 over selectable target 46. Selection of tracking icon 88 by operator 48 may be accomplished in any suitable conventional manner such as, but not limited to, touching or tapping tracking icon 88. The selection of tracking icon 88 is referred to herein as a locking action. In other embodiments, the locking action may comprise any other action or indication by operator 48 that causes three-dimensional selector symbol 54 to lock onto selectable target 46.

Figure 22:
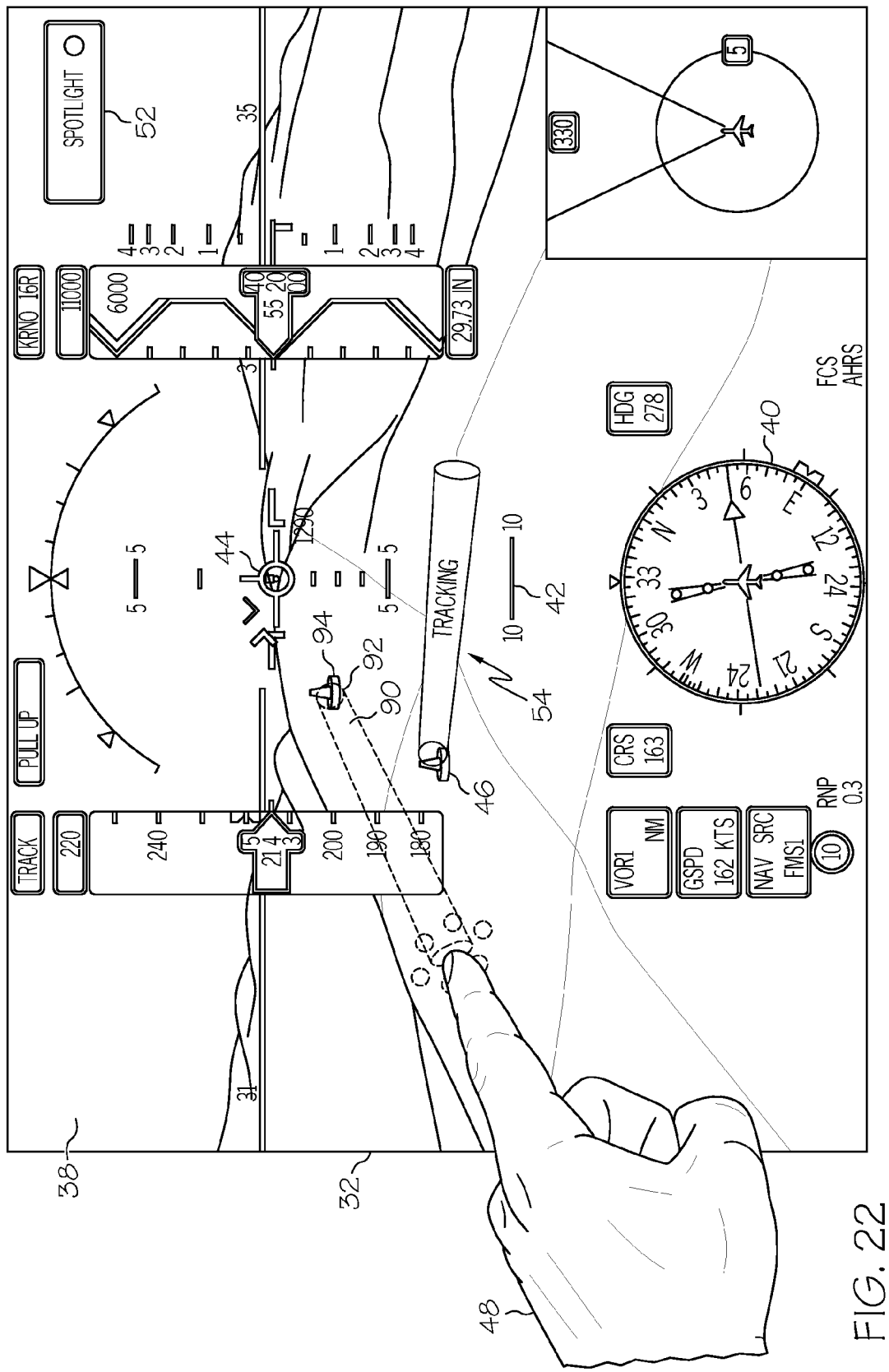
FIG. 22 illustrates the rendering of multiple three-dimensional selector symbols within a three-dimensional image in accordance with an exemplary embodiment.

FIG. 22 illustrates the rendering of multiple three-dimensional selector symbols within three-dimensional image 38. As illustrated in FIG. 22, in addition to three-dimensional selector symbol 54, there also appears a three-dimensional selector symbol 90. With continuing reference to FIGS. 1-22, in some embodiments, display system 30 may be configured to generate any desirable number of three-dimensional selector symbols. As illustrated in FIG. 22, three-dimensional selector symbol 54 is locked onto selectable target 46 and operator 48 has positioned illuminated region 92 of three-dimensional selector symbol 90 over a second selectable target 94. In this manner, operator 48 may track any desirable number of selectable targets.

With continuing reference to FIGS. 1-22, in some embodiments, the processor may be configured to prevent the display screen from rendering the three dimensional selector symbol at certain locations. It may be desirable to prevent the three-dimensional display symbol from pointing towards an area on the display screen where there are no selectable images or symbology. For example, if there are no airborne objects detected in the air in the vicinity of the aircraft, then it may be desirable to limit the three-dimensional selector symbol such that it cannot move off of the ground. In another example, where there is both ground and water beneath or in the vicinity of an aircraft, it may be desirable to limit the three-dimensional selector symbol to only make contact with the ground and to prevent it from passing over the water. Other limitations may also be desirable.

Although the context of the foregoing discussion has been the use of display system 30 in an aircraft, it should be understood that display system 30 is not limited to use with aircraft. Display system 30 has a wide range of uses in the aviation industry and may be used in other facets of the aviation industry including, but not limited to, display systems used by tower controllers, air traffic controllers, and other personnel associated with flight operations. It should be further understood that display system 30 is not limited to usage solely in the aviation industry, but may also be used in any other industry that employs display systems. Furthermore, the three dimensional selector symbol described above and throughout this disclosure is not limited to usage with three dimensional (stereoscopic) images. Rather, it should be understood that the three dimensional selector symbol described above may also be implemented in traditional two dimensional display systems that simulate three dimensional imagery using conventional display techniques to create the appearance of perspective. For example, the three dimensional selector symbol described herein may be used together with conventional Synthetic Vision Systems which depict the terrain around and ahead of an aircraft in a quasi-three-dimensional manner through the use of well known perspective techniques.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for controlling a selector symbol within an image, the display system being configured for use with a display screen that is configured to detect a touch of an operator on a surface of the display screen, and that is further configured to display a three-dimensional image, the display system comprising:
a processor configured to be operatively coupled to the display screen, the processor configured to command the display screen to display a three-dimensional selector symbol within the three-dimensional image, and to command the display screen to move the selector symbol within the three-dimensional image in a manner that corresponds with the touch of the operator, wherein the touch of the operator comprises (1) placement of a single fingertip on a location on the surface of the display screen and (2) pivoting the single fingertip while the fingertip remains on the location;
wherein the processor is further configured to alter the azimuth and an inclination of the three-dimensional selector symbol in a manner that corresponds with the pivoting of the single fingertip; and
wherein the processor is configured to command the display screen to display the three-dimensional selector symbol to appear to extend from the location of the single fingertip on the surface of the display screen into the three-dimensional image, substantially aligned with the single fingertip.

2. The display system of claim 1, wherein the processor is further configured to command the display screen to display a plurality of the three-dimensional selector symbols.

3. The display system of claim 1, wherein the processor is further configured to command the display screen to display a plurality of touch points proximate a location on the surface of the display screen that the operator has touched, and to command the display screen to alter an azimuth and an inclination of the three-dimensional selector symbol in a manner that corresponds with the touch of the operator on the plurality of touch points when the operator touches the plurality of touch points.

4. The display system of claim 1, wherein the processor is further configured to command the display screen to display a control panel on the display screen and to command the display screen to move the three-dimensional selector symbol in a manner that corresponds with the touch of the operator on the control panel when the operator touches the control panel.

5. The display system of claim 1, wherein the processor is further configured to command the display screen to display the three-dimensional selector symbol in a manner that is locked on to a target displayed in the three-dimensional image when the operator inputs a locking action using the display screen.

6. The display system of claim 1, wherein the processor is further configured to command the display screen to display the three-dimensional selector symbol as having an initial orientation that corresponds with a location of an initiating touch the touch by the operator on the surface of the display screen.

7. A display system for controlling a selector symbol within an image, the display system comprising:

a display screen configured to detect a touch of an operator on a surface of the display screen, and further configured to display a three-dimensional image; and
a processor operatively coupled to the display screen, the processor configured to:
command the display screen to display a three-dimensional selector symbol within the three-dimensional image, the three-dimensional selector symbol having a first end displayed on the display screen proximate a first location where the operator has initially touched the surface of the display screen and having a second end displayed on the display screen at a second location spaced apart from the first end,
command the display screen to display the three-dimensional selector symbol such that it has a body that extends into the three-dimensional image from the first location to the second location, and
command the display screen to adjust an azimuth and an inclination of the selector symbol within the three-dimensional image in a manner that corresponds with the touch of the operator, wherein the touch of the operator comprises (1) placement of a single fingertip on a location on the surface of the display screen and (2) pivoting the single fingertip while the fingertip remains on the location.

8. The display system of claim 7 wherein the processor is configured to command the display screen to display the three-dimensional selector symbol to appear to extend from a touching implement used by the operator to touch the display screen and to be substantially aligned therewith.

9. The display system of claim 7 wherein the processor is further configured to command the display screen to display the three-dimensional selector symbol as having an initial orientation that corresponds with a target displayed within the three-dimensional image.

10. The display system of claim 7, wherein the orientation of the second end with respect to the first end comprises the second end extending towards a right side of the display screen when an initial location of the touch is on a left side of the surface of the display screen and wherein the orientation of the second and with respect to the first end comprises the second end extending towards the left side of the display screen when the initial location of the touch is on a right side of the surface of the display screen.

11. The display system of claim 7, wherein the processor is further configured to command the display screen to display the three-dimensional selector symbol as having an initial appearance wherein the first end appears at a location of an initial touch by the operator on the surface of the display screen and wherein the second end appears at a location of a subsequent touch by the operator on the surface of the display screen.

12. The display system of claim 11, wherein the three-dimensional selector symbol is defined by an action whereby the operator drags a touching implement across the surface of the display screen from the location of the initial touch by the operator to the location of the subsequent touch by the operator.

13. The display system of claim 7 wherein the processor is further configured to command the display screen to display a plurality of touch points proximate a location on the surface of the display screen that the operator has touched, and to command the display screen to alter the azimuth and the inclination of the three-dimensional selector symbol in a manner that corresponds with the touch of the operator on the plurality of touch points when the operator touches the plurality of touch points.

14. The display system of claim 7 wherein the processor is further configured to command the display screen to move the three-dimensional selector symbol without altering the azimuth or the inclination of the three-dimensional selector symbol when the operator touches the display screen with a touching implement proximate the first end and slides the touching implement across the surface of the display screen.

15. A display system for controlling a selector symbol within an image, the display system comprising:
- a display screen configured to detect a touch of an operator on a surface of the display screen, and further configured to display a three-dimensional image;
- an input unit configured to receive an input of the operator; and
- a processor operatively coupled to the display screen and to the input unit, the processor configured to:
  - command the display screen to display a three-dimensional selector symbol within the three-dimensional image, and
  - command the display screen to move the selector symbol within the three-dimensional image in a manner that corresponds with the touch of the operator and with the input of the operator, wherein the touch of the operator comprises (1) placement of a single fingertip on a location on the surface of the display screen and (2) pivoting the single fingertip while the fingertip remains on the location, and
  - command the display screen to display the three-dimensional selector symbol to appear to extend from the location of the single fingertip on the surface of the display screen into the three-dimensional image, substantially aligned with the single fingertip.

16. The display system of claim 15, wherein the input unit comprises a joystick.

17. The display system of claim 15, wherein the input unit controls an azimuth and an inclination of the selector symbol and wherein the display screen controls a location on the display screen where the selector symbol initially appears.

* * * * *